(12) United States Patent
Martinez-Botas et al.

(10) Patent No.: US 9,845,770 B2
(45) Date of Patent: Dec. 19, 2017

(54) ASYMMETRIC DOUBLE-ENTRY TURBINE

(71) Applicant: IMPERIAL INNOVATIONS LIMITED, London (GB)

(72) Inventors: Ricardo Martinez-Botas, London (GB); Masakazu Sakai, Tochigi-ken (JP)

(73) Assignee: Imperial Innovations Limited, London (GB)

( * ) Notice: Subject to any disclaimer, the term of this patent is extended or adjusted under 35 U.S.C. 154(b) by 83 days.

(21) Appl. No.: 14/773,793

(22) PCT Filed: Mar. 14, 2014

(86) PCT No.: PCT/GB2014/050771
§ 371 (c)(1),
(2) Date: Sep. 9, 2015

(87) PCT Pub. No.: WO2014/140598
PCT Pub. Date: Sep. 18, 2014

(65) Prior Publication Data
US 2016/0025044 A1   Jan. 28, 2016

Related U.S. Application Data

(60) Provisional application No. 61/790,799, filed on Mar. 15, 2013.

(51) Int. Cl.
*F01D 17/16* (2006.01)
*F01D 9/02* (2006.01)
(Continued)

(52) U.S. Cl.
CPC .......... *F02M 25/0706* (2013.01); *F01D 5/02* (2013.01); *F01D 9/026* (2013.01); *F01D 17/165* (2013.01);
(Continued)

(58) Field of Classification Search
CPC .......... F01D 5/02; F01D 9/026; F01D 17/165; F01D 25/24; F02B 33/40; F02B 37/007;
(Continued)

(56) References Cited

U.S. PATENT DOCUMENTS 5,092,126 A * 3/1992 Yano ..................... F01D 17/146
415/164
2007/0089415 A1   4/2007 Shimokawa et al.
2011/0079009 A1   4/2011 Kratschmer et al.

FOREIGN PATENT DOCUMENTS

DE         4242494 C1    9/1993

OTHER PUBLICATIONS

PCT/GB2014/050771 International Search Report and Written Opinion, dated Jun. 24, 2014, 11 pages.

* cited by examiner

*Primary Examiner* — Audrey K Bradley
(74) *Attorney, Agent, or Firm* — Dorsey & Whitney LLP

(57) ABSTRACT

An asymmetric double-entry turbine is provided with a turbine housing that includes a first volute, a second volute and a turbine receiving bore. The first volute has a first exhaust gas inlet and a first exhaust gas outlet. The second volute has a second exhaust gas inlet and a second exhaust gas outlet. The turbine receiving bore is in fluid communication with the first exhaust gas outlet and the second exhaust gas outlet for conducting a flow of exhaust gas from the first exhaust gas outlet and the second exhaust gas outlet out in an axial direction. The first exhaust gas outlet has an angular opening amount of more than 180 degrees around the turbine receiving bore. The second exhaust gas outlet has an angular opening amount of less than 180 degrees around the turbine receiving bore.

10 Claims, 22 Drawing Sheets

(51) Int. Cl.
    *F01D 5/02*      (2006.01)
    *F02B 37/24*     (2006.01)
    *F02M 26/04*     (2016.01)
    *F02M 25/07*     (2006.01)
    *F02B 37/007*    (2006.01)
    *F02B 37/02*     (2006.01)
    *F02C 6/12*      (2006.01)
    *F01D 25/24*     (2006.01)
    *F02B 33/40*     (2006.01)
    *F02M 26/02*     (2016.01)

(52) U.S. Cl.
    CPC .............. *F01D 25/24* (2013.01); *F02B 33/40* (2013.01); *F02B 37/007* (2013.01); *F02B 37/025* (2013.01); *F02B 37/24* (2013.01); *F02C 6/12* (2013.01); *F02M 26/04* (2016.02); *F02M 26/02* (2016.02); *F05D 2210/12* (2013.01); *F05D 2220/40* (2013.01); *F05D 2240/24* (2013.01); *Y02T 10/144* (2013.01)

(58) Field of Classification Search
    CPC .......... F02B 37/025; F02B 37/24; F02C 6/12; F02M 25/0706; F02M 26/02; F02M 26/04; F05D 2210/12; F05D 2220/40; F05D 2240/24; Y02T 10/144
    See application file for complete search history.

*Small Volute - Fixed Geometry vanes*
*Large Volute - No vanes*

*Small Volute - Fixed Geometry vanes*
*Large Volute - Fixed Geometry vanes*

$$\alpha_s = \alpha_l$$

Small Volute - Fixed Geometry vanes
Large Volute - Fixed Geometry vanes
$\alpha_s \neq \alpha_l$

*Small Volute - Variable Geometry vanes*
*Large Volute - No vanes*

*Small Volute - Variable Geometry vanes*
*Large Volute - Fixed Geometry vanes*

Small Volute - Variable Geometry vanes
Large Volute - Variable Geometry vanes
Single control Small Volute - Variable Geometry vanes
Large Volute - Variable Geometry vanes
Dual control

ASYMMETRIC DOUBLE-ENTRY TURBINE

CROSS-REFERENCE TO RELATED APPLICATIONS

This application is a national stage application of International Application No. PCT/GB2014/050771, filed Mar. 10, 2014, and entitled "ASYMMETRIC DOUBLE-ENTRY TURBINE", which claims priority to U.S. Application No. 61/790,799, filed Mar. 15, 2013, and entitled "ASYMMETRIC DOUBLE-ENTRY TURBINE", both of which are hereby incorporated by reference herein in their entireties for all purposes.

BACKGROUND

Field of the Invention

The present invention generally relates to turbochargers for internal combustion engines. More specifically, the present invention relates to an asymmetric double-entry turbine for a turbocharger in an internal combustion engine having an EGR system.

Background Information

Internal combustion engines such as gasoline engines and diesel engines are sometimes equipped with an exhaust gas turbocharger to boost power and to improve the efficiency of the engine. The exhaust gas turbocharger revolves a turbine by utilizing the pressure of exhaust gas from the internal combustion engine and also drives a compressor by the torque of the turbine for intake air charging the internal combustion engine. Internal combustion engines provided with an exhaust gas turbocharger and also with a bypass circuit that allows the outlet passage of the compressor and the inlet passage of the turbine to connect with each other are also known.

Internal combustion engines provided with the bypass circuit are designed to efficiently driving an exhaust gas recirculation system of the engine, or EGR system. An EGR system reduces the oxygen concentration in the intake air by partly circulating the exhaust gas to the intake air of the internal combustion engine and lowers the combustion temperature of the internal combustion engine in order to suppress the generation of nitrogen oxides (NOx) in exhaust gas. Internal combustion engines provided with the EGR system are so designed that the emission rate of NOx is observed and exhaust gas recirculation is made to take place when the emission rate becomes higher than a predetermined level.

SUMMARY

At least some embodiments provide an asymmetric double-entry turbine that eliminates the needs for providing a nozzle contraction that causes a loss for the large volute in which there is an inflow into majority of its circumference, and allows the turbine to always work at a high efficient point. Also, since this turbine has at least two inlets, it allows an engine including at least four cylinders to provide a pulse turbo-supercharger without exhaust pulse interference. Moreover, this turbine has a simpler structure for a part before turbine blades than a twin entry turbine. Therefore, a variable nozzle can be provided easily. Also, it is easy to control a flow field of the small volute that has the variable nozzle because there is no significant mixing flow.

In view of the state of the known technology, one aspect of the present disclosure is to provide a turbine housing that comprises a first volute, a second volute and a turbine receiving bore. The first volute has a first exhaust gas inlet and a first exhaust gas outlet. The second volute has a second exhaust gas inlet and a second exhaust gas outlet. The turbine receiving bore is in fluid communication with the first exhaust gas outlet and the second exhaust gas outlet for conducting a flow of exhaust gas from the first exhaust gas outlet and the second exhaust gas outlet out in an axial direction. The first exhaust gas outlet has an angular opening amount of more than 180 degrees around the turbine receiving bore. The second exhaust gas outlet has an angular opening amount of less than 180 degrees around the turbine receiving bore.

In view of the state of the known technology, another aspect of the present disclosure is to provide a turbocharged internal combustion engine system that basically comprises an internal combustion engine, an intake passageway, an exhaust passageway, an exhaust gas recirculation line and a turbocharger. The internal combustion engine has a plurality of combustion chambers. The intake passageway is in fluid communication with the combustion chambers to supply intake air to the combustion chambers. The exhaust passageway is in fluid communication with the combustion chambers to discharge exhaust gas to outside of the combustion chambers. The exhaust passageway includes a first exhaust pipe having an inlet end that is fluidly connected to at least two of the combustion chambers and a second exhaust pipe having an inlet end that is fluidly connected to at least two different ones of the combustion chambers from that of the first exhaust pipe. The exhaust gas recirculation line is fluidly connected to recirculate a portion of the exhaust gas discharged from the combustion chambers of only the combustion chambers discharging to the second exhaust pipe. The turbocharger includes a compressor disposed in a portion of the intake passageway and an exhaust turbine disposed in a portion of the exhaust passageway. The exhaust turbine includes an asymmetric double-entry turbine housing having first and second volutes that are circumferentially arranges about a turbine receiving bore of the asymmetric double-entry turbine housing. The first volute has a first volute exhaust gas inlet fluidly connected to the first exhaust pipe and a first exhaust gas outlet in fluid communication with the turbine receiving bore. The second volute has a second exhaust gas inlet fluidly connected to the second exhaust pipe and a second exhaust gas outlet fluidly connected in fluid communication with the turbine receiving bore.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
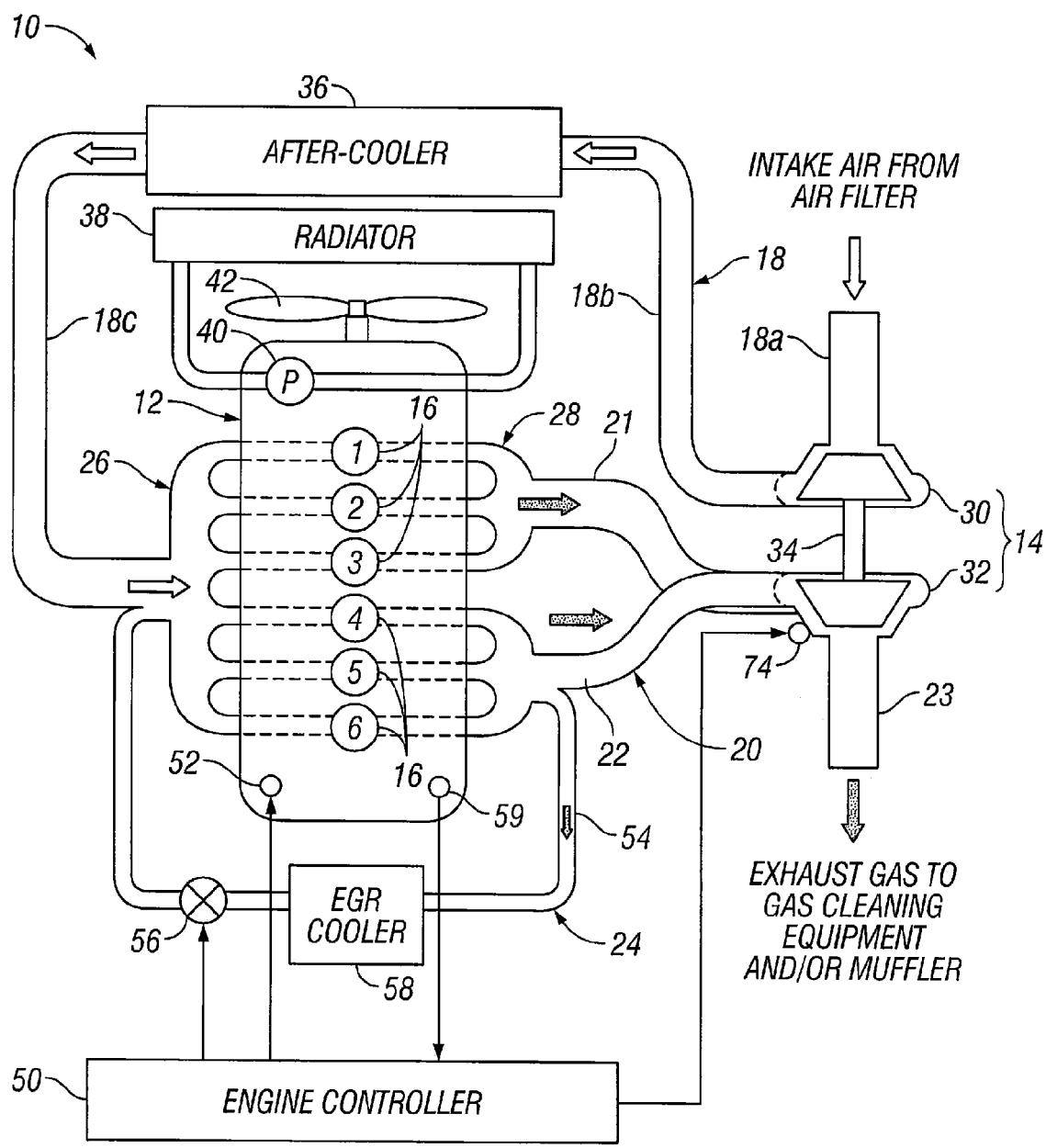
FIG. 1 is a schematic illustration of a turbocharged internal combustion engine system including a diesel engine with an asymmetry double-entry turbine in accordance with selective illustrated embodiment.

Referring initially to FIG. 1, a turbocharged internal combustion engine system 10 is schematically illustrated that is equipped with a diesel engine 12 (hereinafter referred to as "engine 12") having a variable-geometry turbocharger 14 (hereinafter referred to as "turbocharger 14") in accordance with a first illustrated embodiment. Basically, the engine 12 has a plurality of combustion chambers 16 formed therein. In the first illustrated embodiment, the engine 12 has six of the combustion chambers 16 (i.e., cylinders #1, #2, #3, #4, #5 and #6). The firing order of the combustion chambers 16 is as follows: cylinders #1, #5, #3, #6, #2 and #4. While a six cylinder engine is illustrated, the turbocharger 14 can be used with engines with fewer or more cylinders (i.e., combustion chambers) as needed and/or desired.

The internal combustion engine system 10 further includes an intake passageway 18, an exhaust passageway 20 and an exhaust gas recirculation system 24. The intake passageway 18 is in fluid communication with the combustion chambers 16 to supply intake air to the combustion chambers 16. The exhaust passageway 20 is in fluid communication with the combustion chambers 16 to discharge exhaust gas to the outside of the combustion chambers 16. The exhaust gas recirculation system 24 recirculates a portion of the exhaust gas back to the intake passageway 18 for reducing the discharge amount of NOx in the exhaust gas that is discharged to the environment.

An intake manifold 26 is mounted between the intake passageway 18 and the engine 12 so that intake air from the intake passageway 18 is distributed to the respective combustion chambers 16. An exhaust manifold 28 is mounted between the engine 12 and the exhaust passageway 20 so that exhaust gas from the respective combustion chambers 16 flow together into the exhaust passageway 20.

Basically, the turbocharger 14 is equipped with a compressor 30 and an exhaust turbine 32. The compressor 30 is provided in a mid-portion of the intake passageway 18. The compressor 30 coupled to the exhaust turbine 32 by a shaft 34 such that the compressor 30 is driven by the exhaust turbine 32. The exhaust turbine 32 is provided in a mid-portion of the exhaust passageway 20. In particular, as discussed below, the exhaust turbine 32 is an asymmetry double-entry turbine. Thus, the exhaust passageway 20 includes a first exhaust pipe 21 having an inlet end that is fluidly connected to the cylinders #1, #2 and #3 of the combustion chambers 16 via the exhaust manifold 28, and a second exhaust pipe 22 having an inlet end that is fluidly connected to the cylinders #4, #5 and #6 of the combustion chambers 16. Basically, in the case of fewer or more than six cylinder engines, the first exhaust pipe 21 has its inlet end fluidly connected to at least one of the combustion chambers 16 and the second exhaust pipe 22 has its inlet end fluidly connected to at least a different one of the combustion chambers 16 from that of the first exhaust pipe 21. The outlet ends of the first exhaust pipe 21 and the second exhaust pipe 22 are fluidly connected to the exhaust turbine 32 for supplying exhaust gas thereto. The exhaust passageway 20 also has a third exhaust pipe 23 that is fluidly connected to the exhaust turbine 32 for discharging the exhaust gas therefrom. The third exhaust pipe 23 can be connected conventional exhaust gas cleaning equipment and/or a muffler as needed and/or desired.

The intake passageway 18 includes a first intake pipe 18a having an inlet end that is fluidly connected to an air filter (not shown) that receives fresh outside air. The outlet end of the first intake pipe 18a is fluidly connected to the compressor 30, which is driven by the exhaust turbine 32. The intake passageway 18 further includes a second intake pipe 18b having an inlet end that is fluidly connected to the compressor 30 for receiving air that is discharged from the compressor 30. An after-cooler 36 is provided in a mid-portion of the intake passageway 18 for cooling air that was compressed by the compressor 30 of the turbocharger 14. In particular, the after-cooler 36 is fluidly connected to the outlet end of the second intake pipe 18b and an inlet end of a third intake pipe 18c of the intake passageway 18. The outlet end of a third intake pipe 18c is fluidly connected to the inlet of the intake manifold 26.

Preferably, the internal combustion engine system 10 includes a conventional cooling system for cooling the engine 12. The cooling system is equipped with a radiator 38 and a pump 40, which are fluidly connected together in a conventional manner. The pump 40 is driven by, for example, a crankshaft (not shown) accommodated in the engine 12. The pump 40 circulates coolant force through the engine 12 to cool the engine 12. The coolant is cooled by the radiator 38. The cooling operations of the radiator 38 and the after-cooler 36 are promoted by a fan 42, which is rotationally driven by the crankshaft of the engine 12 or the like.

The internal combustion engine system 10 further includes an engine controller 50 for controlling the operation of the engine 12. For example, the engine controller 50 controls a fuel injection unit 52 to control the fuel injection timing and the amount of fuel that is injected into each of the combustion chambers 16. The engine controller 50 also preferably controls a valve timing of the intake valves and a valve timing of the exhaust valves in a conventional manner. The engine controller 50 also controls the turbocharger 14 for compressing the intake air to supercharge the engine 12.

The exhaust gas recirculation system 24 includes an exhaust gas recirculation line 54 for extracting part of the exhaust gas from the exhaust manifold 28 to recirculate the extracted exhaust (EGR) gas back to the intake passageway 18 and/or the intake manifold 28. Preferably, the exhaust gas recirculation line 54 is connected to the intake passageway 18 and fluidly communicates with the intake passageway 18 at a narrow portion of a venturi (not shown) that is provided in the intake passageway 18. Alternatively, the exhaust gas recirculation line 54 can be directly connected to the intake manifold 28. The exhaust gas recirculation system 24 also includes an EGR valve 56 that selectively opens and closes the exhaust gas recirculation line 54, and an EGR cooler 58 for cooling the recirculated (extracted) exhaust gas that is being recirculated back to the intake passageway 18. The EGR valve 56 is opened and closed by the engine controller 50 based on detected engine operating conditions. For example, the EGR valve 56 is opened and closed by the engine controller 50 based on an engine rotational speed that is detected by an engine speed sensor 59 and a command value of a fuel injection amount from the engine controller 50. The engine controller 50 controls the EGR valve 56 in such a manner as to reduce the amount of NOx in the exhaust gas that is discharged.

The engine controller 50 preferably includes a microcomputer with various control programs that control operations of the engine 12, the turbocharger 14, the fuel injection unit 52, the EGR valve 56, etc. The engine controller 50 preferably includes other conventional components such as an input interface circuit, an output interface circuit, and storage devices such as a ROM (Read Only Memory) device and a RAM (Random Access Memory) device. For example, the memory of the engine controller 50 has prestored therein various maps for controlling the operational state of the turbocharged internal combustion engine system 10.

Figure 2:
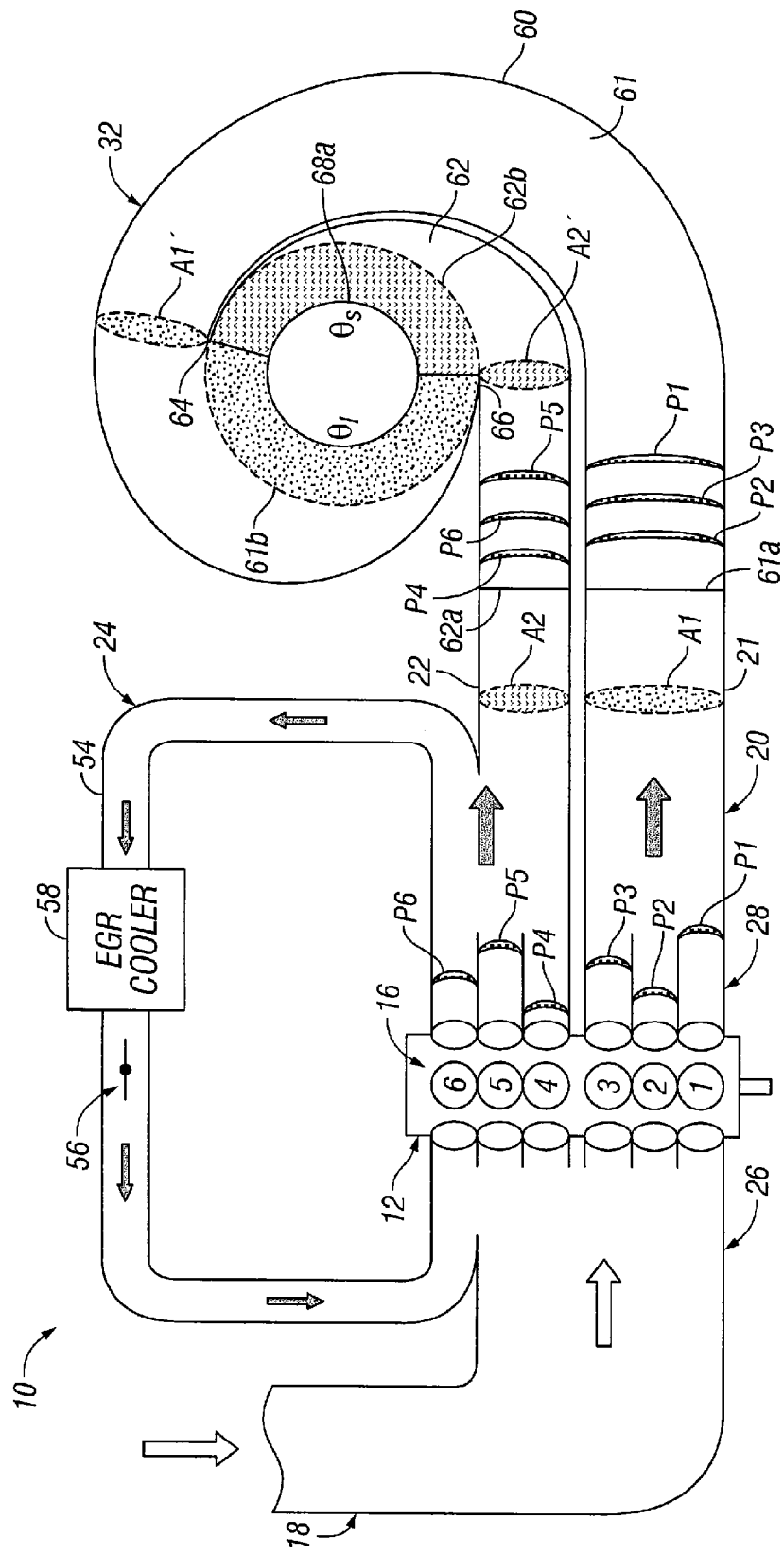
FIG. 2 is a schematic diagram of a portion of the turbocharged internal combustion engine system illustrated in FIG. 1 that focuses on the exhaust gas flow of the asymmetry double-entry turbine and the EGR system in accordance with the illustrated embodiments.

Now, referring to FIGS. 2 and 3, an overview of the exhaust gas flow to the exhaust turbine 32 of the turbocharger 14 and the control of the recirculated exhaust gas that is being recirculated back to the intake passageway 18 will be discussed in more detail. As seen in FIG. 2, in the illustrated embodiments, the cylinders #1, #2 and #3 of the combustion chambers 16 are physically separated from the cylinders #4, #5 and #6 of the combustion chambers 16. In particular, the exhaust gas from the cylinders #1, #2 and #3 of the combustion chambers 16 flow into the first exhaust pipe 21, while the exhaust gas from the cylinders #4, #5 and #6 of the combustion chambers 16 flow into the second exhaust pipe 22. Also the exhaust gas recirculation line 54 is fluidly connected to the exhaust manifold 28 to receive exhaust gas from only the cylinders #4, #5 and #6 of the combustion chambers 16. While the engine 12 is running, exhaust gas pulses P1 to P6, which are produced as the exhaust valves open and close, from the cylinders #1, #2, #3, #4, #5 and #6, respectively.

As seen FIG. 2, basically, the exhaust turbine 32 of the turbocharger 14 has a turbine housing 60 having a first (large) volute 61, a second (small) volute 62 and an axially extending turbine receiving bore 63. The first volute 61 has a first volute exhaust gas inlet 61a with a cross sectional area A1. Here, the first volute exhaust gas inlet 61a receives a stream of commingled exhaust gases from the cylinders #1, #2 and #3. The first volute 61 has a first exhaust gas outlet 61b with a cross sectional area A1' at the beginning of the first exhaust gas outlet 61b, which extends circumferentially from a tip or free end of a first tongue 64 to a tip or free end of a second tongue 66 in a counterclockwise direction as illustrated in FIG. 2. The second volute 62 has a second exhaust gas inlet 62a with a cross sectional area A2. Here, the second exhaust gas inlet 62a receives a stream of commingled exhaust gases from the cylinders #4, #5 and #6. The second volute 62 has a second exhaust gas outlet 62b with a cross sectional area A2' at the beginning of the second exhaust gas outlet 62b, which extends circumferentially from the tip end of a second tongue 66 to the tip end of the first tongue 64 in a counterclockwise direction as illustrated in FIG. 2. The cross sectional areas A1 and A2 of the first and second volutes 61 and 62 can be substantially the same as in the illustrated embodiments of FIGS. 8 to 16, which are discussed below. Alternatively, the cross sectional area A2 of the second volute 62 can be smaller than the cross sectional area A1 of the first volute 61. In both cases, the first volute 61 and the second volute 62 are of different sizes from along the areas of their exhaust gas outlets 61b and 62b, respectively. In particular, the first volute 61 has an A/R that is greater at the tip end of the first tongue 64 than an A/R of the second volute 62 at the tip end of the second tongue 64.

As diagrammatically illustrated in FIG. 2, the first exhaust gas outlet 61b opens circumferentially along more than 180 degrees of the turbine receiving bore 63, while the second exhaust gas outlet 62b circumferentially opens along less than 180 degrees of the turbine receiving bore 63. The angular split ratio between the first exhaust gas outlet 61b and the second exhaust gas outlet 62b depends on the EGR rate. Preferably, for a 10% EGR rate, the first exhaust gas outlet 61b has an angular opening amount of approximately 200 degrees around the turbine receiving bore 63, and the second exhaust gas outlet 62 has an angular opening amount of approximately 160 degrees around the turbine receiving bore 63. Preferably, for a 20% EGR rate, the first exhaust gas outlet 61b has an angular opening amount of approximately 225 degrees around the turbine receiving bore 63, and the second exhaust gas outlet 62b has an angular opening amount of approximately 135 degrees around the turbine receiving bore 63. However, the angular split ratio between the first exhaust gas outlet 61b and the second exhaust gas outlet 62b for a particular EGR rate is not limited to these angular split ratios. As seen in Table 1 below, some examples of asymmetric double-entry turbine are provided that have a non-equal angular split ratio and a plurality of vanes that are equally spaced apart in a circumferential direction such that vanes are located at the outlets of both the large volute and the small volute.

TABLE 1

| Number of Vanes | | | Angular Split Ratio | | |
|---|---|---|---|---|---|
| Total | Large | Small | Large | Small | Ratio |
| 19 | 12 | 7 | 227.4 | 132.6 | 1.71 |
| 19 | 11 | 8 | 208.4 | 151.6 | 1.38 |
| 19 | 10 | 9 | 189.5 | 170.5 | 1.11 |
| 18 | 12 | 6 | 240.0 | 120.0 | 2.00 |
| 18 | 11 | 7 | 220.0 | 140.0 | 1.57 |
| 18 | 10 | 8 | 200.0 | 160.0 | 1.25 |
| 17 | 11 | 6 | 232.9 | 127.1 | 1.83 |
| 17 | 10 | 7 | 211.8 | 148.2 | 1.43 |
| 17 | 9 | 8 | 190.6 | 169.4 | 1.13 |
| 16 | 11 | 5 | 247.5 | 112.5 | 2.20 |
| 16 | 10 | 6 | 225.0 | 135.0 | 1.67 |
| 16 | 9 | 7 | 202.5 | 157.5 | 1.29 |
| 16 | 8 | 8 | 180.0 | 180.0 | 1.00 |
| 15 | 10 | 5 | 240.0 | 120.0 | 2.00 |
| 15 | 9 | 6 | 216.0 | 144.0 | 1.50 |
| 15 | 8 | 7 | 192.0 | 168.0 | 1.14 |
| 14 | 9 | 5 | 231.4 | 128.6 | 1.80 |
| 14 | 8 | 6 | 205.7 | 154.3 | 1.33 |
| 13 | 9 | 4 | 249.2 | 110.8 | 2.25 |
| 13 | 8 | 5 | 221.5 | 138.5 | 1.60 |
| 13 | 7 | 6 | 193.8 | 166.2 | 1.17 |

While in the above examples, the vanes are equally spaced apart in a circumferential direction, the present invention is not limited to such an arrangement. In particular, the vanes can be arranged such that the vanes only control the mass flow of exhaust gas from the exhaust gas outlet of the small volute. Thus, vanes can be located only at the outlet of the small volute plus one additional vane located at the upstream end of the exhaust gas outlet of the large volute to control the entire mass flow exiting from the exhaust gas outlet of the small volute.

Figure 3:
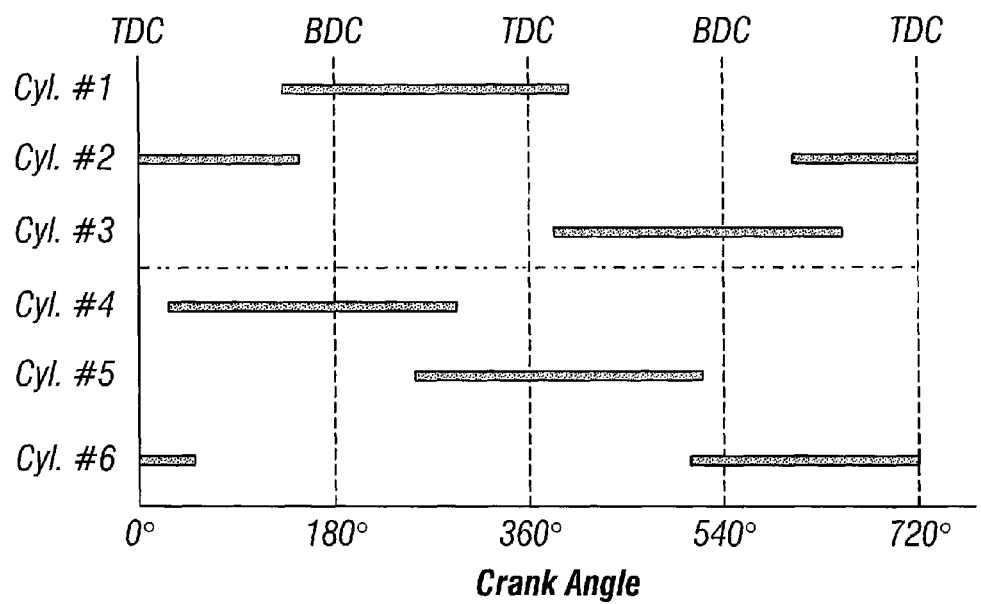
FIG. 3 is a graph illustrating the exhaust gas pulses from the cylinders of the six cylinder engine illustrated in FIG. 1.

As seen FIG. 3, in an engine, such as the engine 12, having four or more cylinders, exhaust pulse interference occurs between the pulsating exhaust gases that are produced as the exhaust valves open and close. Thus, by separating the exhaust gas from the cylinders #1, #2, #3, #4, #5 and #6 into the first and second exhaust pipes 22a and 22b, as discussed above, the engine 12 can efficiently utilize exhaust scavenging techniques, which improves turbine system performance and reduces turbo lag.

Turning now to the designing of the first volute 61 and the second volute 62 of the turbine housing 60 for the exhaust turbine 32. First, in designing a turbine housing, such as the turbine housing 60, the A/R is known to be a fundamental design aspect for volute design. The equation (1) for the A/R is shown below.

$$A/R = \frac{\text{Cross sectional area of volute}}{\text{Radius of the centroid of the section}} \quad (1)$$

Figure 4:
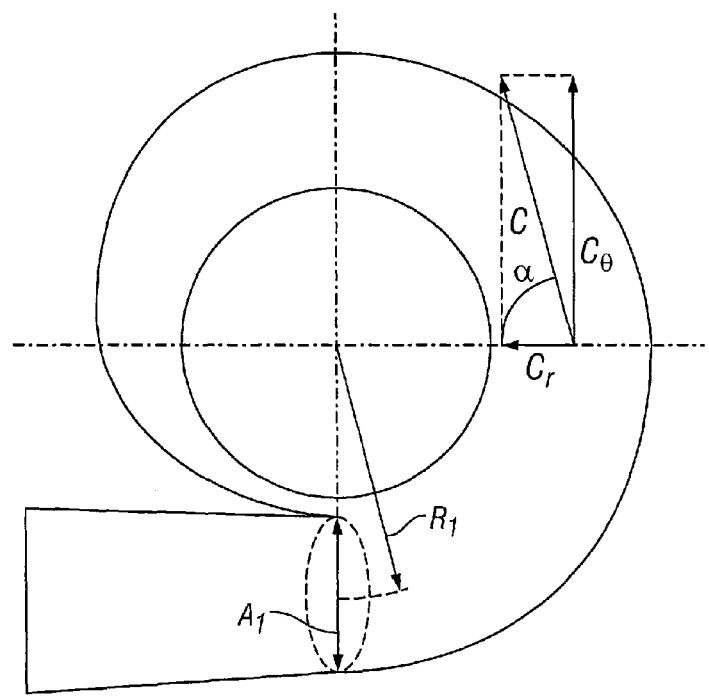
FIG. 4 is a schematic diagram of a conventional turbine having a single-entry volute.

Referring to FIG. 4, a conventional single-entry volute turbine housing is illustrated to aid in understanding the design of the double-entry volute turbine housing 60. In FIG. 4, in a single-entry volute turbine housing, an absolute flow angle α of the exhaust gas in the single volute is decide based on an absolute flow velocity C of the exhaust gas, which is determined by a circumferential velocity $C_\theta$ of the exhaust gas and a radial velocity $C_r$ of the exhaust gas.

For single-entry volute turbine housing, the absolute flow angle α can be expressed by the following equation (2):

$$\cot\alpha = \frac{A_1}{R_1} \cdot \frac{1}{2\pi b} \qquad (2)$$

where
the term $A_1$ represents a cross sectional area of the volute at the plane of the volute tongue;
the term $R_1$ represents a radius of a centroid of the section at the plane of the volute tongue; and
the term b represents an outlet width of the volute.

In designing of the double-entry volute turbine housing 60, it is assumed that is similar to designing a single-entry volute turbine housing. However, one main difference is circumferential division of the volute outlets of the two volutes. The circumferential division of the volute outlets of the two volutes can be expressed by the following Equation (3):

$$\theta_s + \theta_l = 2\pi \qquad (3)$$

where the term $\theta_s$ represents an angular degree of the small volute outlet;
the term $\theta_l$ represents an angular degree of the large volute outlet.

Since mass flows on both of the volutes flow into common turbine blades, the flow angles should be identical for the two volutes. Thus, combining Equations (2) and (3), the flow angle for a double-entry volute turbine housing can be expressed by the following equation (4):

$$\cot\alpha = \frac{A_s}{R_s} \cdot \frac{1}{\theta_s b} = \frac{A_l}{R_l} \cdot \frac{1}{\theta_l b} \qquad (4)$$
$$\cot\alpha = \frac{A_s}{r_s} \cdot \frac{1}{\theta_s b}$$

where
the term $A_s$ represents a cross sectional area of the small volute at the plane of the small volute tongue;
the term $R_s$ represents a radius of the volute centroid at the plane of the small volute tongue;
the term $A_l$ represents a cross sectional area of the large volute at the plane of the large volute tongue; and
the term $R_l$ represents a radius of the volute centroid at the plane of the large volute tongue.

Figure 5:
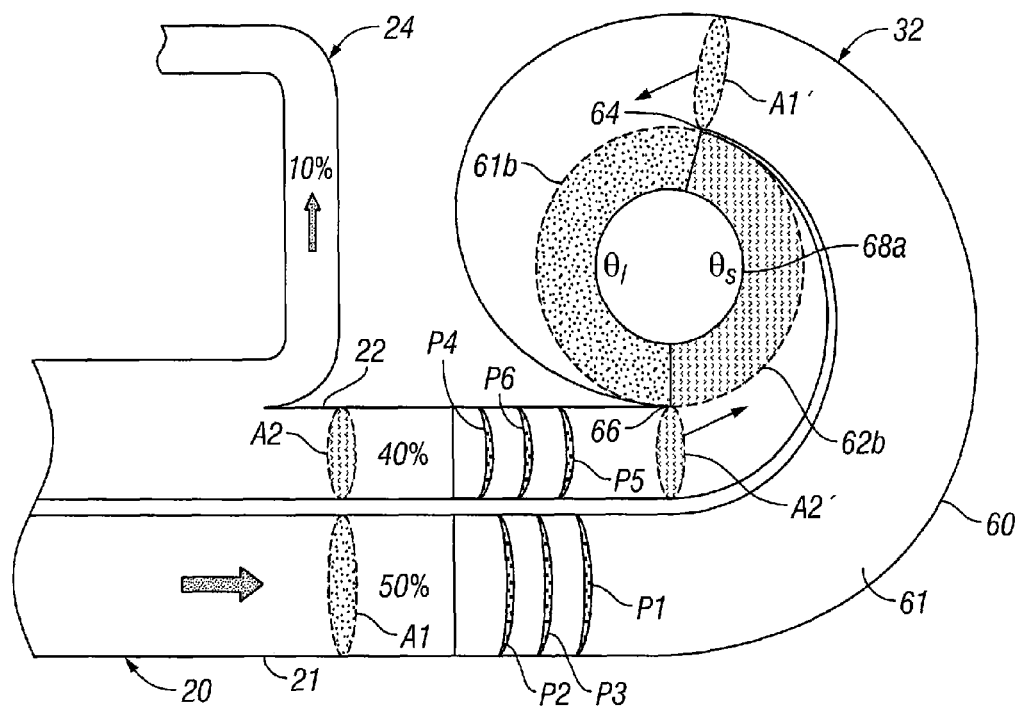
FIG. 5 is another schematic diagram of a portion of the turbocharged internal combustion engine system illustrated in FIG. 1 that focuses on the exhaust gas flow of the asymmetry double-entry turbine and the EGR system in accordance with the illustrated embodiments.

For example, as seen in FIG. 5, when the EGR rate is set to 10%, the A/R ratio design for the large and small volutes can be expressed by the following equation (5):

$$\frac{A_s/R_s}{A_l/R_l} = \frac{\theta_s}{\theta_l} = \frac{40\%}{50\%} \qquad (5)$$

The mass flow balance of the exhaust gas is changed depending on the EGR rate that is desired and/or needed. As a result, the flow velocity of the small volute is increased or decreased. On the other hand, the absolute angle is constant. Thus, based on the designed EGR rate, the A/R ratio between the small and large volutes is designed. Stated differently, the A/R ratio between the small and large volutes is designed with their matching point depending upon the EGR rate.

Figure 6:
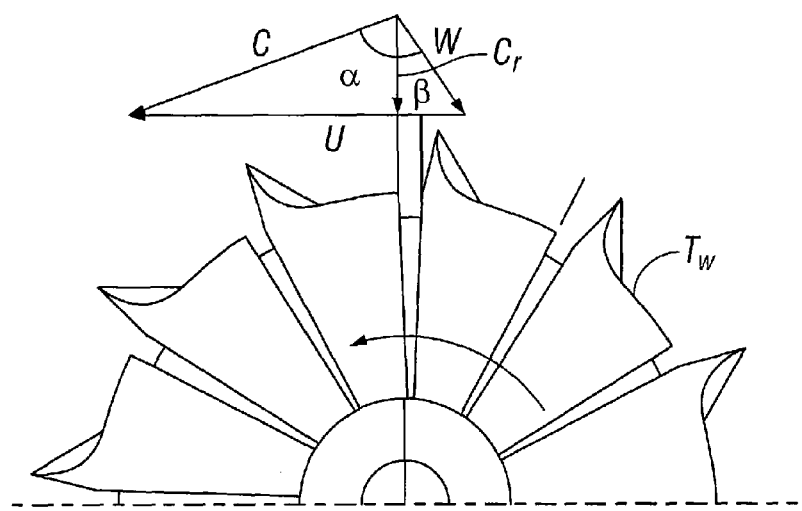
FIG. 6 is a partial axial end view of a conventional turbine wheel showing a flow velocity triangle.
Figure 7:
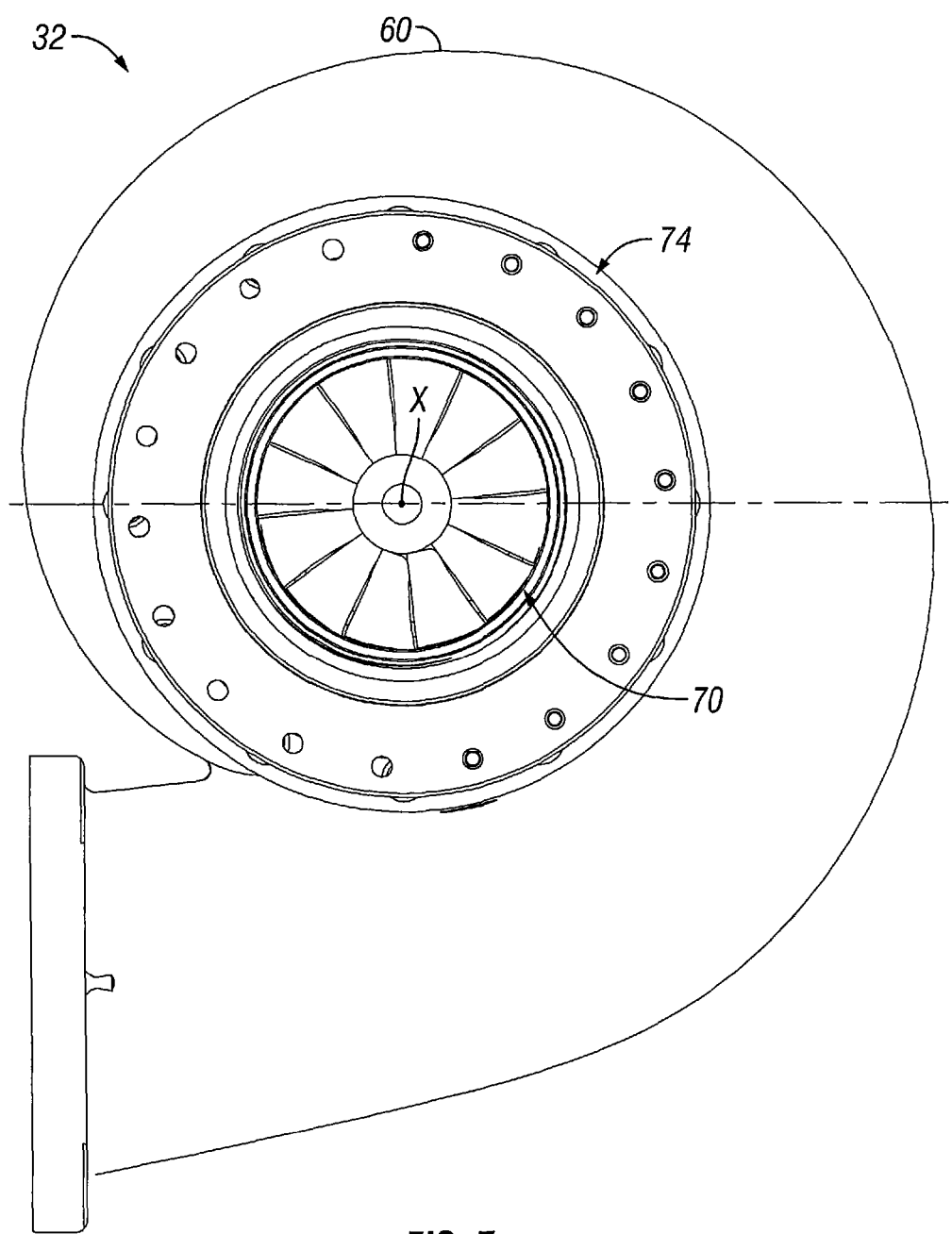
FIG. 7 is a side elevational view of the asymmetry double-entry turbine of the illustrated embodiments.

Referring to FIG. 6, the relative flow angle β of the exhaust gas β is also a fundamental design aspect from efficiency point of view in designing an exhaust turbine such as the exhaust turbine 32. As seen in FIG. 6, the relative flow angle β of the exhaust gas is the angle between the radial velocity $C_r$ of the exhaust gas and the relative flow velocity W with respect to the turbine wheel Tw. From this relationship, the tip speed U (blade tip rotating speed) can be determined mainly by the mass flow of the first volute 61 which flows into majority of the discharge passageway 68a. Basically, the absolute flow angle α is constant regardless of mass flow. On the other hand, the relative flow angle β changes when absolute flow velocity C of the mass flow is increased or decreased, since the relative flow angle β is decided by the velocity triangle illustrated in FIG. 6. When the absolute flow velocity C of the exhaust gas of the small volute is changed, the relative flow angle β of the exhaust gas of the small volute may not be optimum angle. To optimize efficiency, the relative flow angle β is more important than the absolute flow angle α. Therefore, the absolute flow angle α is preferably set to optimize the relative flow angle β. The absolute flow angle α can be adjusted by turning the variable geometry vanes of the exhaust turbine 32 as discussed below.

In considering these design parameters, the turbine housing 60 was developed that is used in each of the various configurations of the exhaust turbine 32 of FIGS. 8 to 14. In other words, in the illustrated embodiments of FIGS. 8 to 14, the exhaust turbine 32 is identical in each embodiment, except that the vane configuration (i.e., the number of vanes and/or whether the vanes are fixed geometry vanes or variable geometry vanes) has been changed. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

As seen in FIGS. 7 to 14, the exhaust turbine 32 further includes an exit duct 68 and a turbine wheel 70. The exit duct 68 is fixedly mounting in the turbine receiving bore 63 of the turbine housing 60 to form a discharge passageway 68a of the turbine 32. The exit duct 78 is connected to the third exhaust pipe 23, which is shown in FIG. 1. The turbine wheel 70 is rotatably mounted within the turbine receiving bore 63 of the turbine housing 60 and extends into the upstream end of the exit duct 68. The turbine wheel 70 is connected to the shaft 34 whose opposite end is connected to the compressor 30 for boosting performance of the engine 12. The shaft 34 defines a rotational axis X of the turbine wheel 70. The turbine receiving bore 63 is coaxially arranged about the rotational axis X. Thus, the first and second volutes 61 and 62 surround the turbine wheel 70 such that exhaust gases are forced into the turbine wheel 70 via the first and second exhaust gas outlets 61b and 62b. The first and second volutes 61 and 62 are divided and separated from each other by the tongues 64 and 66. The turbine housing 60 defines the turbine receiving bore 63 that extends along an axial direction generally parallel to the rotational axis X of the turbine wheel 70. After exhaust gases have passed through the turbine wheel 70, the gases are discharged in the axial direction through the discharge passageway 68a.

Depending on the embodiment, the exhaust turbine 32 is provided with a plurality of first vanes 71 and/or a plurality of second vanes 72. The first vanes 71 are disposed in a circumferential arrangement around the turbine receiving bore 63 along the first (large volute) exhaust gas outlet 61b. The second vanes 72 are disposed in a circumferential arrangement around the turbine receiving bore 63 along the second (small volute) exhaust gas outlet 62b and with one additional one of the second vanes 72 being located at the upstream end of the first exhaust gas outlet 61b.

Figure 8:
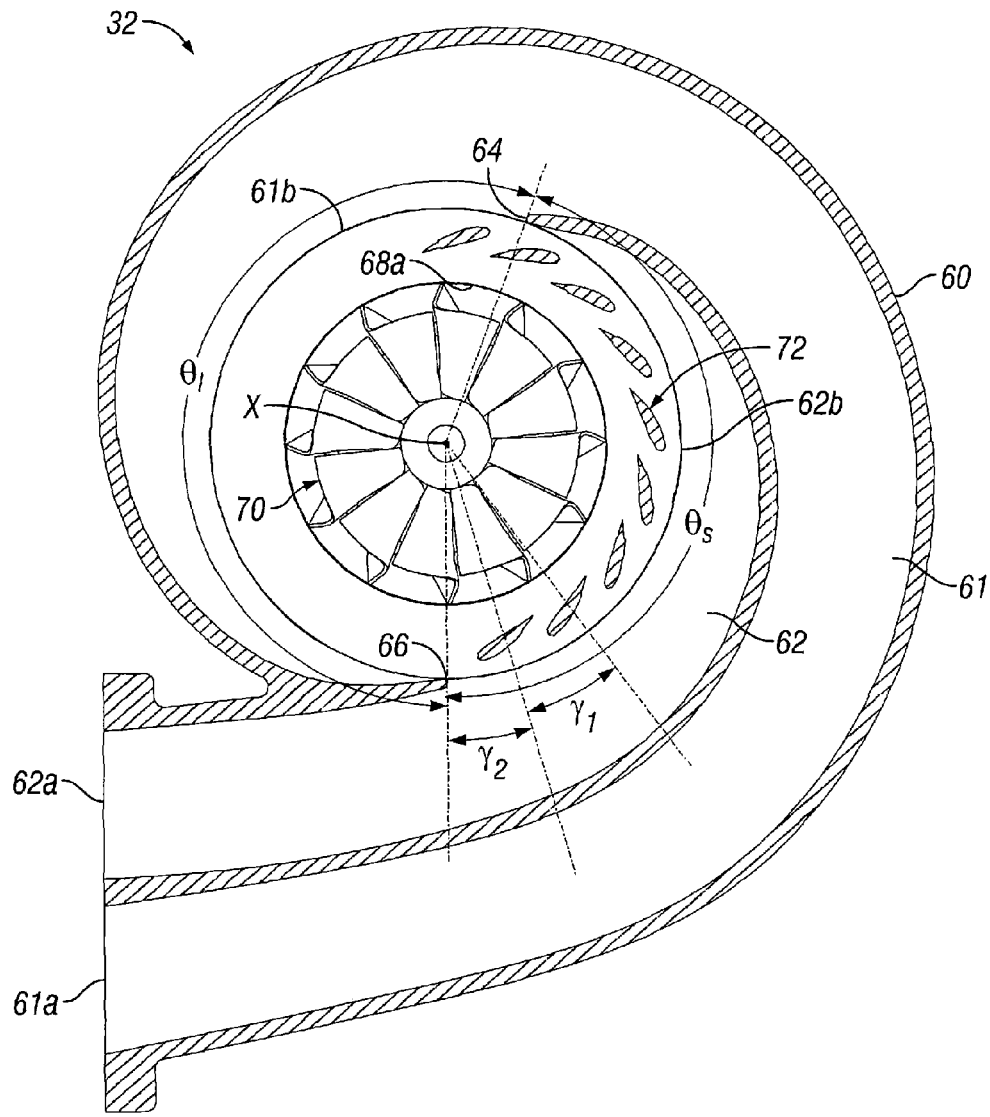
FIG. 8 is a central transverse cross sectional view of the asymmetry double-entry turbine having a plurality of fixed geometry vanes located at the small volute outlet and one fixed geometry vane located at the large volute outlet in accordance with a first embodiment as seen along a section line perpendicular to the rotational axis of the turbine wheel.
Figure 9:
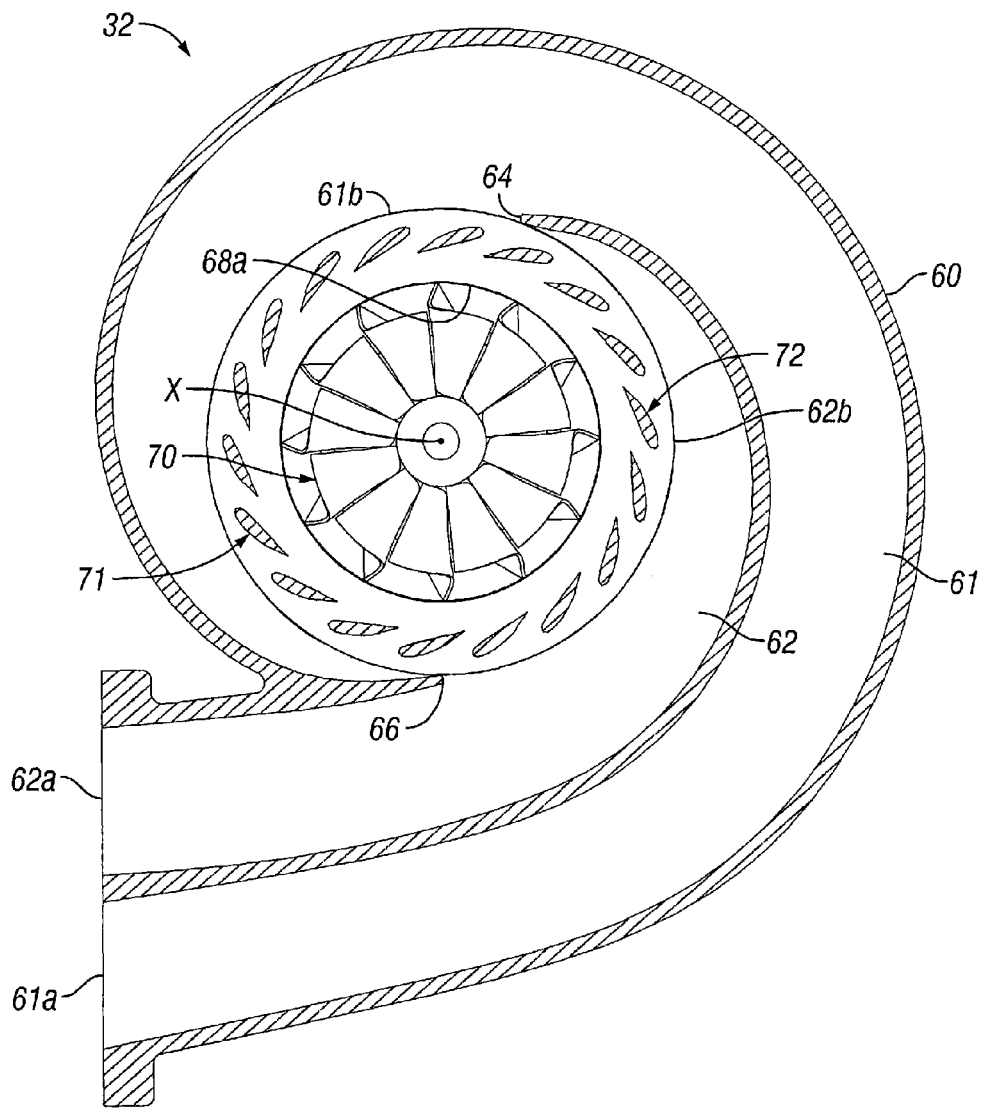
FIG. 9 is a central transverse cross sectional view of the asymmetry double-entry turbine having a plurality of fixed geometry vanes located at the large and small volute outlets with the angle of the fixed geometry vanes being the same in accordance with a second embodiment as seen along a section line perpendicular to the rotational axis of the turbine wheel.
Figure 10:
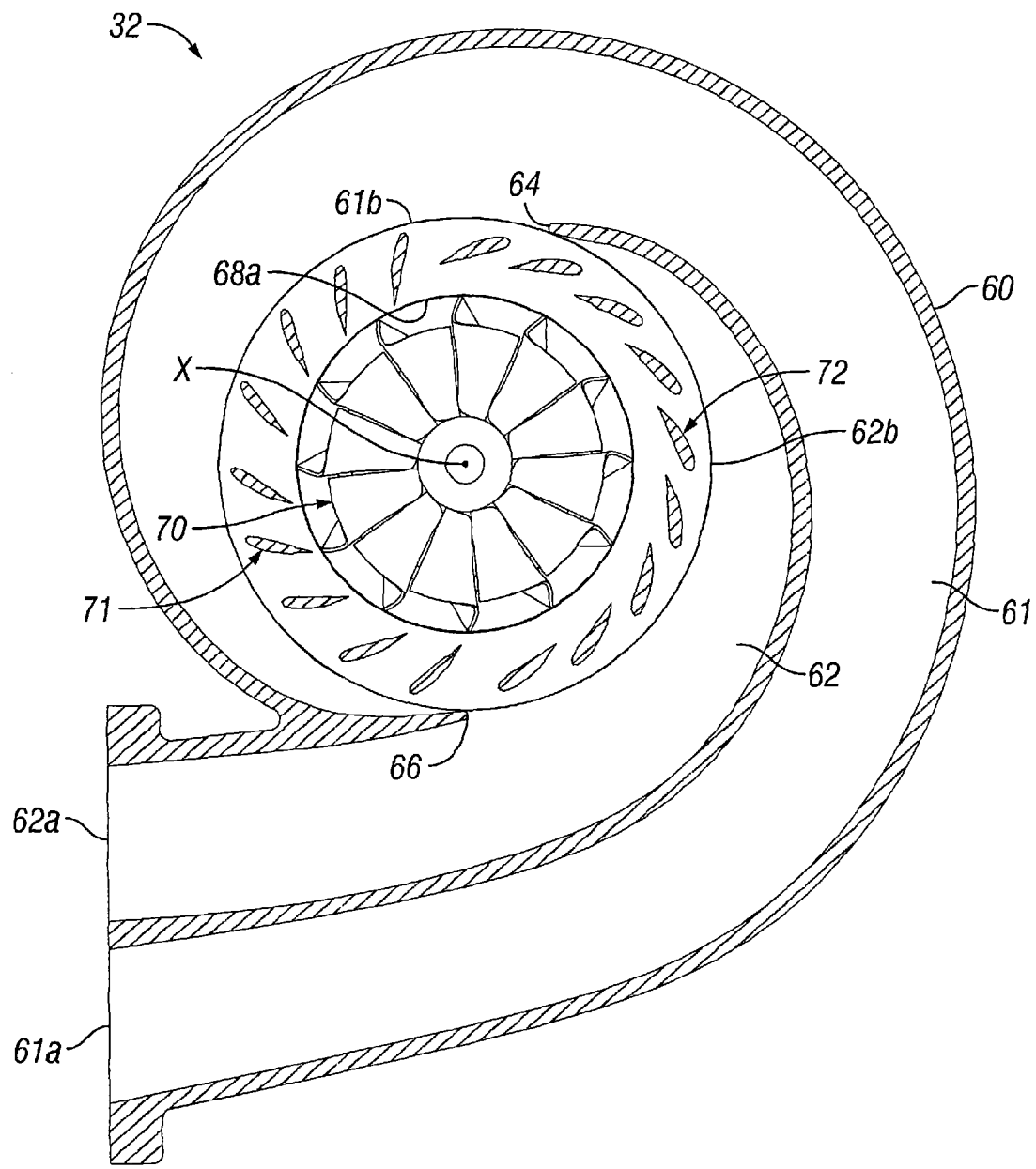
FIG. 10 is a central transverse cross sectional view of the asymmetry double-entry turbine having a plurality of first fixed geometry vanes located at the large volute outlet and a plurality of second fixed geometry vanes located at the small volute outlet with the angle of the first fixed geometry vanes being different from the angle of the second fixed geometry vanes in accordance with a third embodiment as seen along a section line perpendicular to the rotational axis of the turbine wheel.

In each of the illustrated embodiments of FIGS. 8 to 14, the exhaust turbine 32 is provided, for example, with a total of nine of the second vanes 72. However, the exhaust turbine 32 is only provided with the first vanes 71 (e.g., a total of nine vanes) in the embodiments of FIGS. 9, 10, 12, 13 and 14. In the embodiments of FIGS. 8 to 10, only fixed geometry vanes are used. However, in the embodiments of FIGS. 11 to 14, variable geometry vanes are used either alone or in combination with fixed geometry vanes. In particular, a single variable vane geometry control mechanism 74 is used to adjust the flow angles of the second vanes 72 in the illustrated embodiments of FIGS. 11 and 12. In the illustrated embodiment of FIG. 13, the variable vane geometry control mechanism 74 is used to adjust the flow angles of both the first and second vanes 71 and 72. In the illustrated embodiment of FIG. 14, the variable vane geometry control mechanism 74 is used to adjust the flow angles of the second vanes 72, while an additional variable vane geometry control mechanism 75 is provided to independently adjust the flow angles of the first vanes 71 with respect to the second vanes 72. Preferably, variable geometry vanes, such as the second vanes 72, are used at least at the small volute exhaust gas outlet in order to adjust the flow angle to compensate for a change in the EGR rate.

First Embodiment

As seen in FIG. 8, in the first embodiment, the second vanes 72 of the turbine 32 are fixed geometry vanes that are circumferentially spaced apart by an angle $\gamma_1$ (e.g., twenty degrees in the illustrated embodiments). Thus, each of the second vanes 72 in this embodiment has a fixed flow angle. Of course, it will be apparent from this disclosure that the flow angles of the second vane and 72 are not limited to the illustrated flow angles. The second vanes 72 are located at the second (small volute) exhaust gas outlet 62b and with one additional one of the second vanes 72 being located at the upstream end of the first exhaust gas outlet 61b. The most upstream one of the second vanes 72 is preferably has its center mounting point spaced downstream from the tip of the tongue 66 in a circumferential direction by an angle $\gamma_2$ (e.g., about fifteen degrees in the illustrated embodiments). The turbine 32 of FIG. 8 does not include any of the first vanes 71. In the case of the first embodiment, a relatively simply asymmetry double-entry turbine can be manufactured, since no vanes are provide at the volute outlet and simple fixed vanes are used. Thus, the variable vane geometry control mechanism 74 can be eliminated.

Second Embodiment

As seen in FIG. 9, in the second embodiment, the first and second vanes 71 and 72 of the turbine 32 are fixed geometry vanes that are equally spaced apart in a circumferential with respect to the rotational axis X of the turbine wheel 70. Since there are a total of eighteen vanes, the first and second vanes 71 and 72 are circumferentially spaced apart by twenty degrees. Thus, the first and second vanes 71 and 72 are located at the first and second exhaust gas outlets 61b and 62b. In the case of the second embodiment, a relatively simply asymmetry double-entry turbine can also be manufactured, since only simple fixed vanes are used which have the same flow angles. Thus, the variable vane geometry control mechanism 74 can also be eliminated in this embodiment.

Third Embodiment

As seen in FIG. 10, in the third embodiment, the first and second vanes 71 and 72 of the turbine 32 are fixed geometry vanes that are equally spaced apart in a circumferential with respect to the rotational axis X of the turbine wheel 70. Since there are a total of eighteen vanes, the first and second vanes 71 and 72 are circumferentially spaced apart by about twenty degrees. Thus, the first and second vanes 71 and 72 are located at the first and second exhaust gas outlets 61b and 62b. In other words, all of the first vanes 71 have a first prescribed vane angle, while the second vanes 72 all have a second prescribed vane angle. In this third embodiment, the first flow angles of the first vanes 71 are different from the second flow angles of the second vanes 72. Of course, it will be apparent from this disclosure that the flow angles of the first and second vanes 71 and 72 are not limited to the illustrated flow angles. In the case of the third embodiment, a relatively simply asymmetry double-entry turbine can also be manufactured, since only simple fixed vanes are used. Thus, the variable vane geometry control mechanism 74 can also be eliminated in this embodiment. However, the exhaust flow can be better controlled by optimizing the flow angles of the first and second vanes 71 and 72.

Fourth Embodiment

Figure 11:
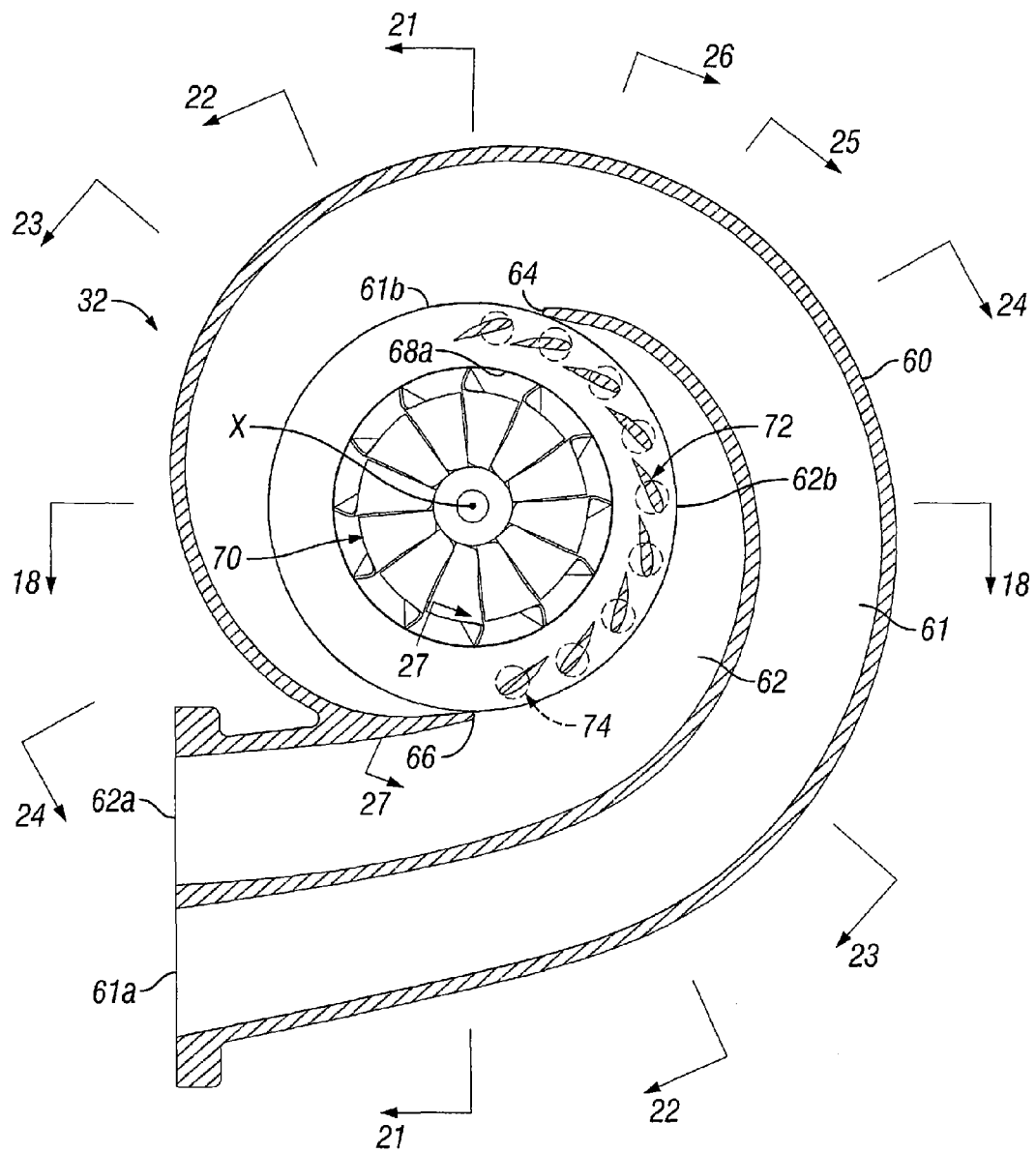
FIG. 11 is a central transverse cross sectional view of the asymmetry double-entry turbine having a plurality of variable geometry vanes located at the small volute outlet and one variable geometry vane at the large volute outlet in accordance with a fourth embodiment as seen along a section line perpendicular to the rotational axis of the turbine wheel.

As seen in FIG. 11, in the fourth embodiment, the second vanes 72 of the turbine 32 are variable geometry vanes. Thus, in this embodiment, the flow angles of the second vanes 72 are adjustable using the variable vane geometry control mechanism 74, which is discussed below. Similar to FIG. 8, the second vanes 72 are located at the second (small volute) exhaust gas outlet 62b and with one additional one of the second vanes 72 being located at the upstream end of the first exhaust gas outlet 61b. The most upstream one of the second vanes 72 is preferably has its pivot point spaced downstream from the tip of the tongue 66 in a circumferential direction by about fifteen degrees. The turbine 32 of FIG. 11 does not include any of the first vanes 71. In the case of the fourth embodiment, the asymmetry double-entry turbine is more complex than the first to third embodiments. However, the exhaust flow can be better controlled for changes in the EGR rate by adjusting the flow angles of the second vanes 72.

Fifth Embodiment

Figure 12:
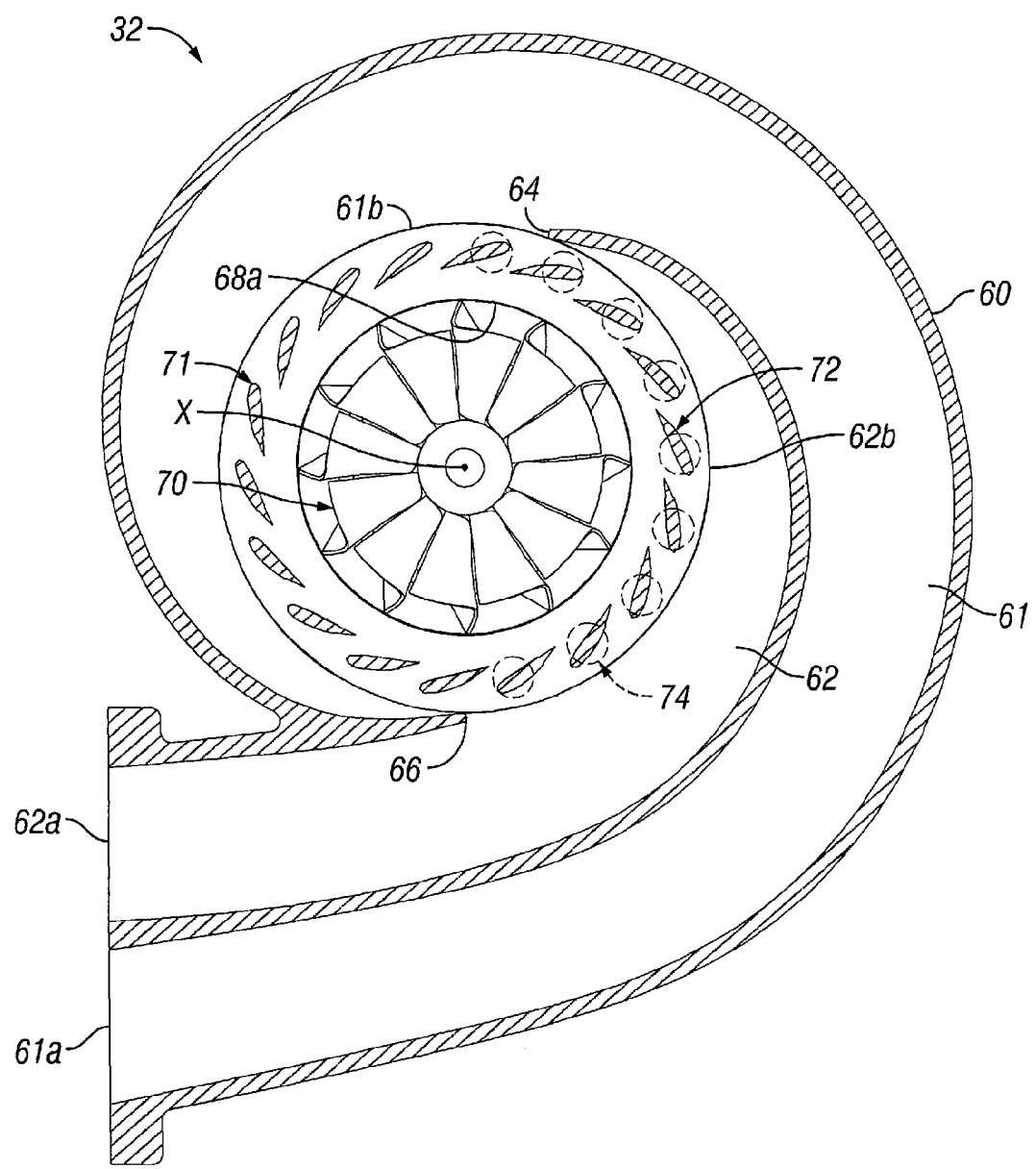
FIG. 12 is a central transverse cross sectional view of the asymmetry double-entry turbine having a plurality of fixed geometry vanes located at the large volute outlet and a plurality of variable vanes located at the small volute outlet in accordance with a fifth embodiment as seen along a section line perpendicular to the rotational axis of the turbine wheel.

As seen in FIG. 12, in the fifth embodiment, the first vanes 71 of the turbine 32 are fixed geometry vanes, while the second vanes 72 of the turbine 32 are variable geometry vanes. The first and second vanes 71 and 72 are equally spaced apart in a circumferential with respect to the rotational axis X of the turbine wheel 70. Thus, in this embodiment, the flow angles of the second vanes 72 are adjustable using the variable vane geometry control mechanism 74, which is discussed below. Since there are a total of eighteen vanes, the first and second vanes 71 and 72 are circumferentially spaced apart by about twenty degrees as in the embodiment of FIG. 9. Thus, the first and second vanes 71 and 72 are located at both the first and second exhaust gas outlets 61b and 62b.

Sixth Embodiment

Figure 13:
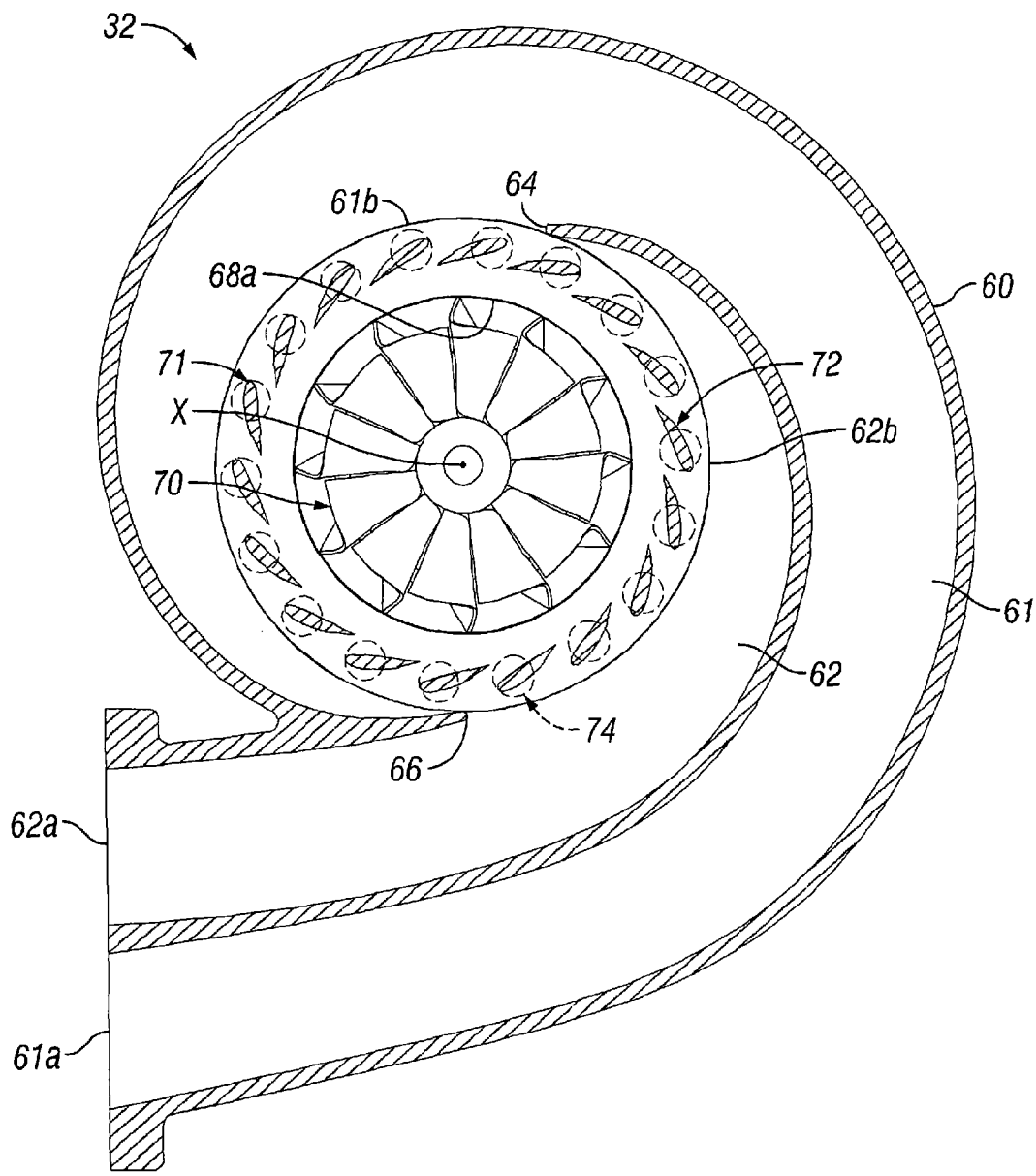
FIG. 13 is a central transverse cross sectional view of the asymmetry double-entry turbine having a plurality of variable geometry vanes located at the large and small volute outlets that are adjustable with a single variable vane geometry control mechanism in accordance with a sixth embodiment as seen along a section line perpendicular to the rotational axis of the turbine wheel.
Figure 14:
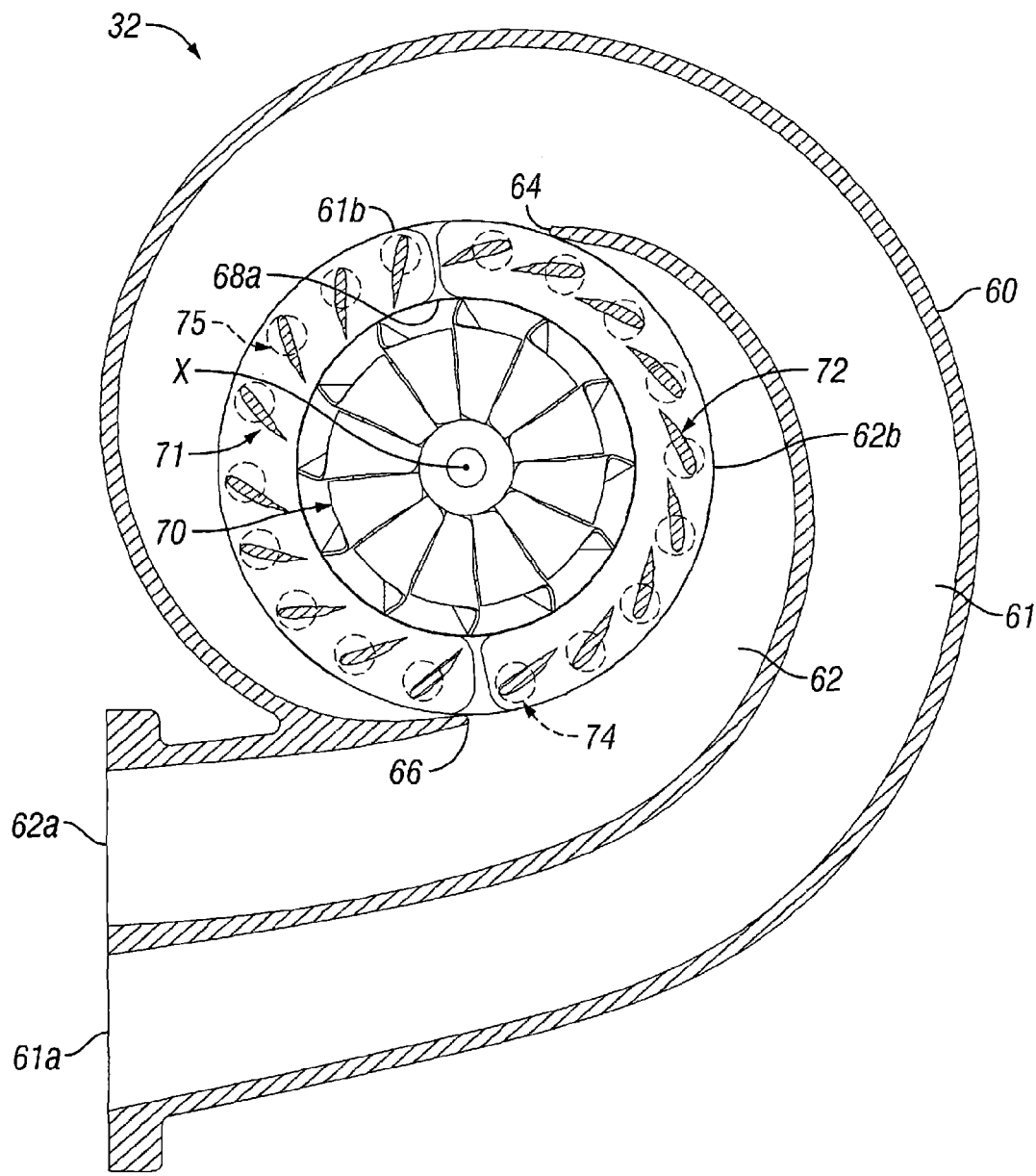
FIG. 14 is a central transverse cross sectional view of the asymmetry double-entry turbine having a plurality of first variable geometry vanes located at the large volute outlet and a plurality of second variable geometry vanes located at the small volute outlet with the angle of the first and second variable geometry vanes being independently adjustable using a dual variable vane geometry control mechanism in accordance with a seventh embodiment as seen along a section line perpendicular to the rotational axis of the turbine wheel.

As seen in FIG. 13, in the sixth embodiment, the first and second vanes 71 and 72 of the turbine 32 are both variable geometry vanes. Here, the variable vane geometry control mechanism 74 is used to adjust the flow angles of both the first and second vanes 71 and 72. Similar to some of the other embodiments, the first and second vanes 71 and 72 are equally spaced apart in a circumferential with respect to the rotational axis X of the turbine wheel 70. The first vane angle can be different from the second vane angle. However, both first and second vane angles are controlled by the variable vane geometry control mechanism 74.

Seventh Embodiment

As seen in FIG. 13, in the sixth embodiment, the first and second vanes 71 and 72 of the turbine 32 are both variable geometry vanes. Here, the variable vane geometry control mechanism 74 is used to adjust the flow angles of the second vanes 72, while the additional variable vane geometry control mechanism 75 is provided to independently adjust the flow angles of the first vanes 71 with respect to the second vanes 72.

Figure 15:
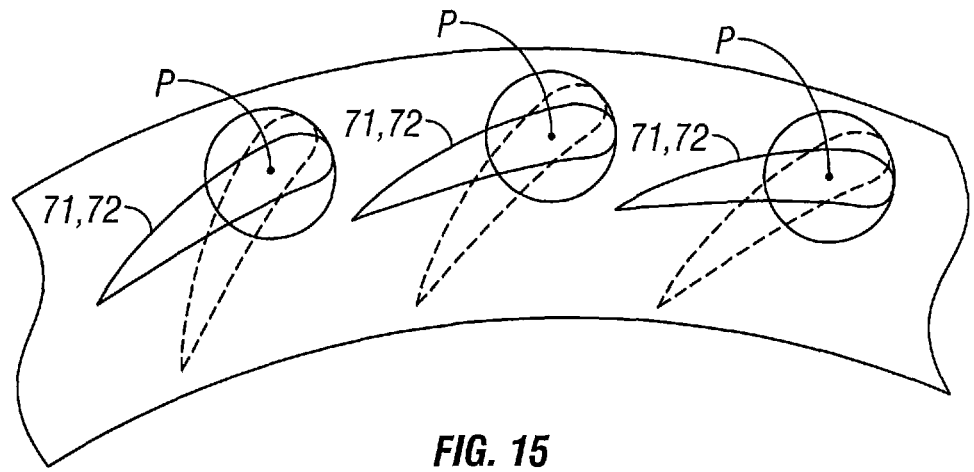
FIG. 15 is a partial elevational view of a portion of the variable geometry vanes showing the adjustment of the flow angle of the variable geometry vanes.

As seen in FIG. 15, a portion of the variable geometry vanes 71 or 72 is illustrated to show the adjustment of the flow angle of the variable geometry vanes by either the variable vane geometry control mechanism 74 or the additional variable vane geometry control mechanism 74. As illustrated, the variable geometry vanes 71 and/or 72 are swingably mounted such that the variable geometry vanes 71 or 72 move simultaneously together by the same amount of angular movement about their respective pivot axis P.

Figure 16:
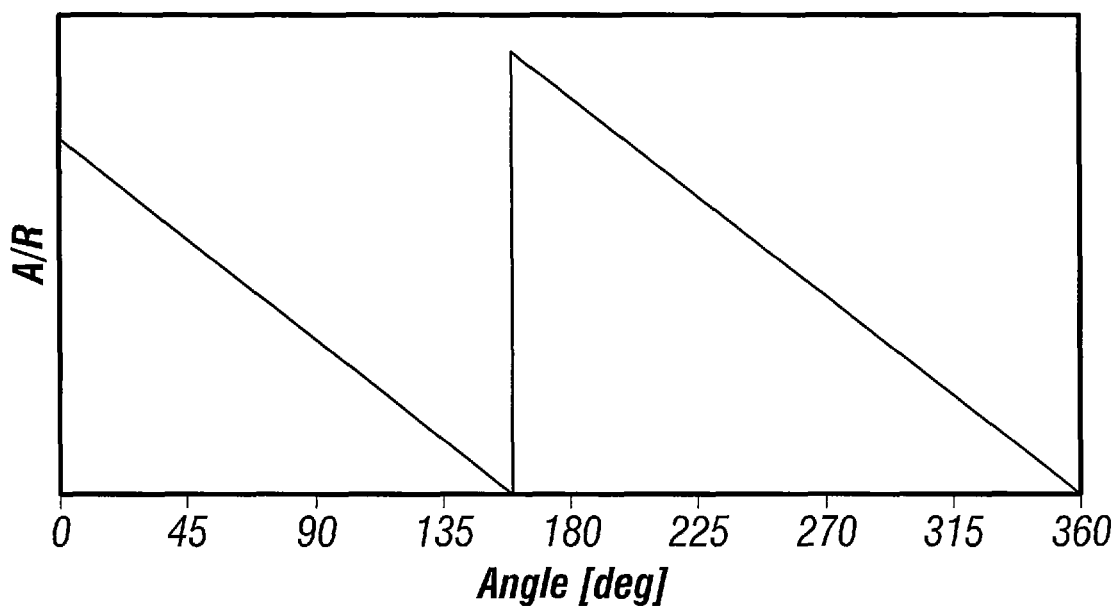
FIG. 16 is a graph that illustrates one possible example of the A/R with respect to angular locations of the first and second volutes for the turbine of the illustrated embodiment of FIG. 9.

Referring now to FIG. 16, by way of example only, a graph is illustrated that generally shows one possible example of the A/R of the turbine housing 60 for the first and second exhaust outlets 61b and 62b of the first and second volutes 61 and 62 starting at the tip of the second tongue 66 for the embodiment of the turbine 32 illustrated in FIG. 9. While the inclined lines indicating the A/R of the turbine housing 60 are shown as being linear, it will be apparent to those skilled in the engine design field that the inclined lines indicating the A/R of the turbine housing 60 are generally linear (i.e., not perfectly linear). From zero degrees to 160 degrees, the A/R of the turbine housing 60 corresponds to only the second volute 62, since only the second exhaust outlet 62b of the second volute 62 opens to the turbine receiving bore 63. From 160 degrees to 360 degrees, the A/R of the turbine housing 60 corresponds to only the first volute 61, since only the first exhaust outlet 61b of the first volute 61 opens to the turbine receiving bore 63. Regarding the others embodiments, depending on the vane configuration, the inclined lines indicating the A/R of the graph of FIG. 16 may be linear and/or non-linear for the others embodiments.

Figure 17:
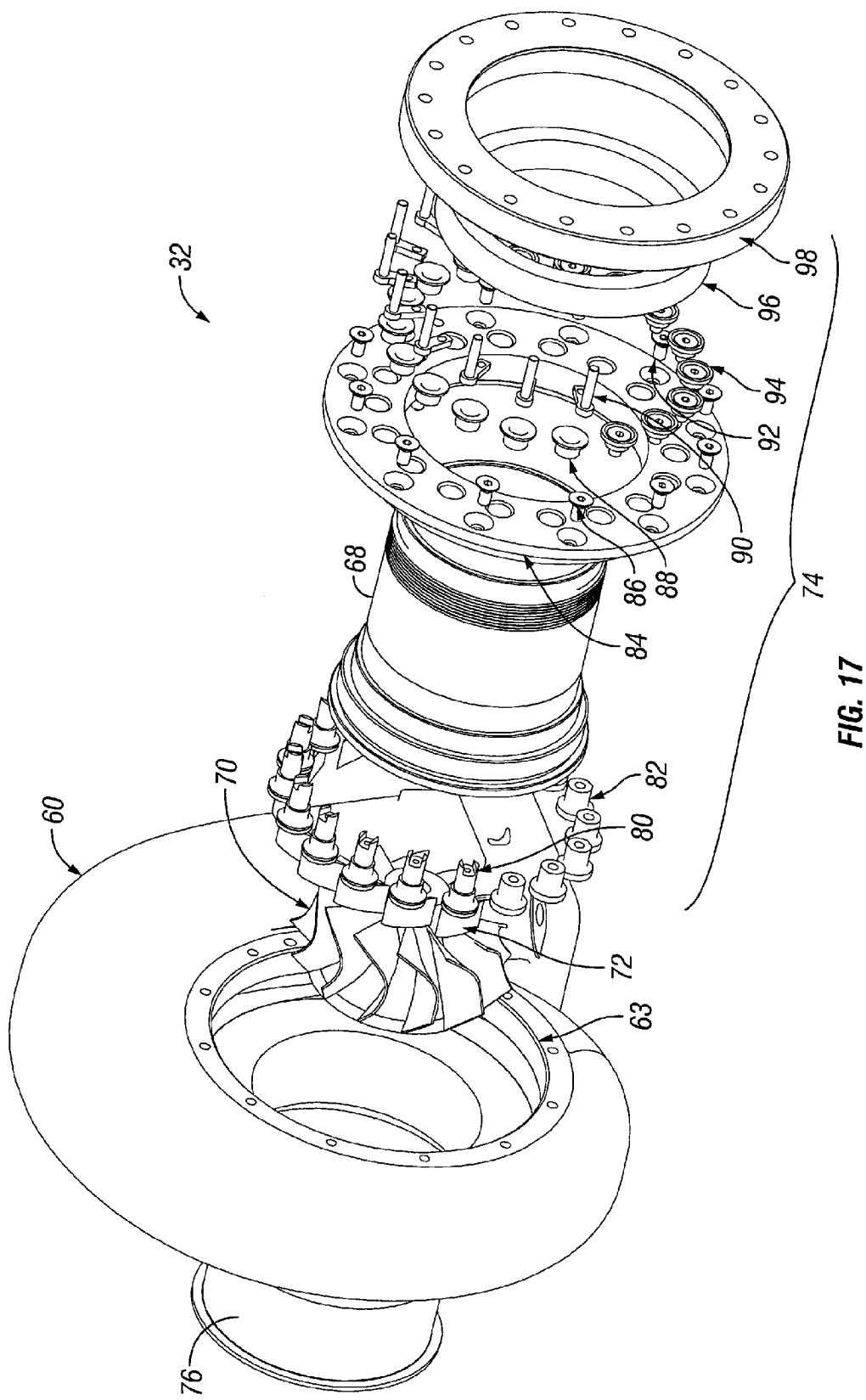
FIG. 17 is an exploded perspective view of the asymmetry double-entry turbine in which nine variable geometry vanes are utilized in accordance with the fourth embodiment of FIG. 11.
Figure 18:
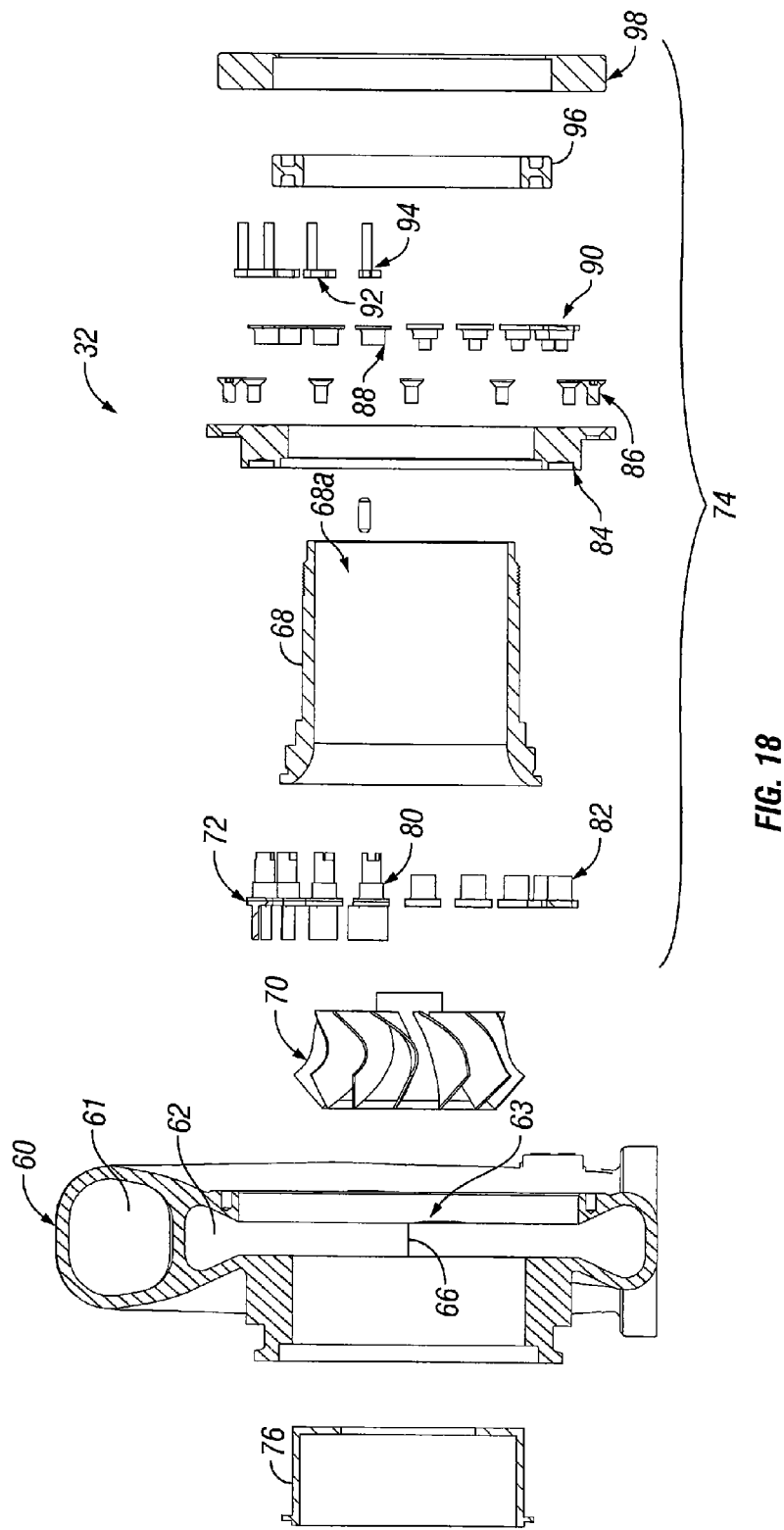
FIG. 18 is an exploded cross sectional view of the asymmetry double-entry turbine illustrated in FIGS. 11 and 17 as seen along a section line 18-18 of FIG. 11.

Referring now to FIGS. 17 and 18, the main parts of the turbine 32 are illustrated as configured in accordance with the fourth embodiment. In addition to the parts of the turbine 32 that are mentioned, above, the turbine 32 further includes an end cap 76. The end cap 76 is fixed to the turbine housing 60 to be coaxial with the turbine receiving bore 63 of the turbine housing 60. Since the functions and operations of these main parts of the turbine 32 are readily apparent to those skilled in the engine design field, these main parts will not be discussed in detail herein for the sake of brevity.

As seen in FIGS. 17 and 18, the main parts of the variable vane geometry control mechanism 74 are illustrated as configured for the turbine 32 of the fourth embodiment. In the fourth illustrated embodiment, the variable vane geometry control mechanism 74 is a swinging type variable vane geometry control mechanism that adjusts the flow angles of the second vanes 72. However, the exhaust turbine 32 can be used with other types of variable vane geometry control mechanisms such as sliding types of variable vane geometry control mechanisms.

Basically, the variable vane geometry control mechanism 74 includes a plurality of first bearing bushings 80, a plurality of inner plugs 82, a mounting ring 84, a plurality of screws 86, a plurality of second bearing bushings 88, a plurality of outer plugs 90, a plurality of control levers 92, a drive pin 94, a drive ring bearing 96 and a drive ring 98. The drive ring 98 can be controlled by either electric or pneumatic actuation to regulate the turbocharger's nozzle geometry. The drive ring 98 adjusts the flow angles of the vanes 72 to alter the apertures between the vanes 72 through which the exhaust gases flow onto the turbine wheel 70. This alteration in the geometry of the turbine 32 increases the boost as the flow angle of the vanes 72 is closed down. Reducing the aperture increases exhaust manifold pressure and increases the turbocharger speed. As the drive ring 98 opens up the flow angles of the vanes 72, the exhaust pressure reduces and the turbocharger boost can decrease, or simply maintain ideal boost levels as the aperture increases to raise the turbine's exhaust swallowing capacity to compensate for increasing engine rotational speed.

Since there are nine of the second vanes 72 in the fourth illustrated embodiment, the variable vane geometry control mechanism 74 is configured with nine variable geometry vanes and nine sets of inner and outer plugs 82 and 90 for this arrangement as seen in FIGS. 17 and 18. However, the variable vane geometry control mechanism 74 can be eliminated or modified to the configuration of the first to third illustrated embodiments and the fifth to seventh embodiments. Since the construction and operation of the variable vane geometry control mechanism 74 is self-evident to those skilled in the field of engine design from the drawings, the variable vane geometry control mechanism 74 will not be discussed in further detail herein.

Figure 19:
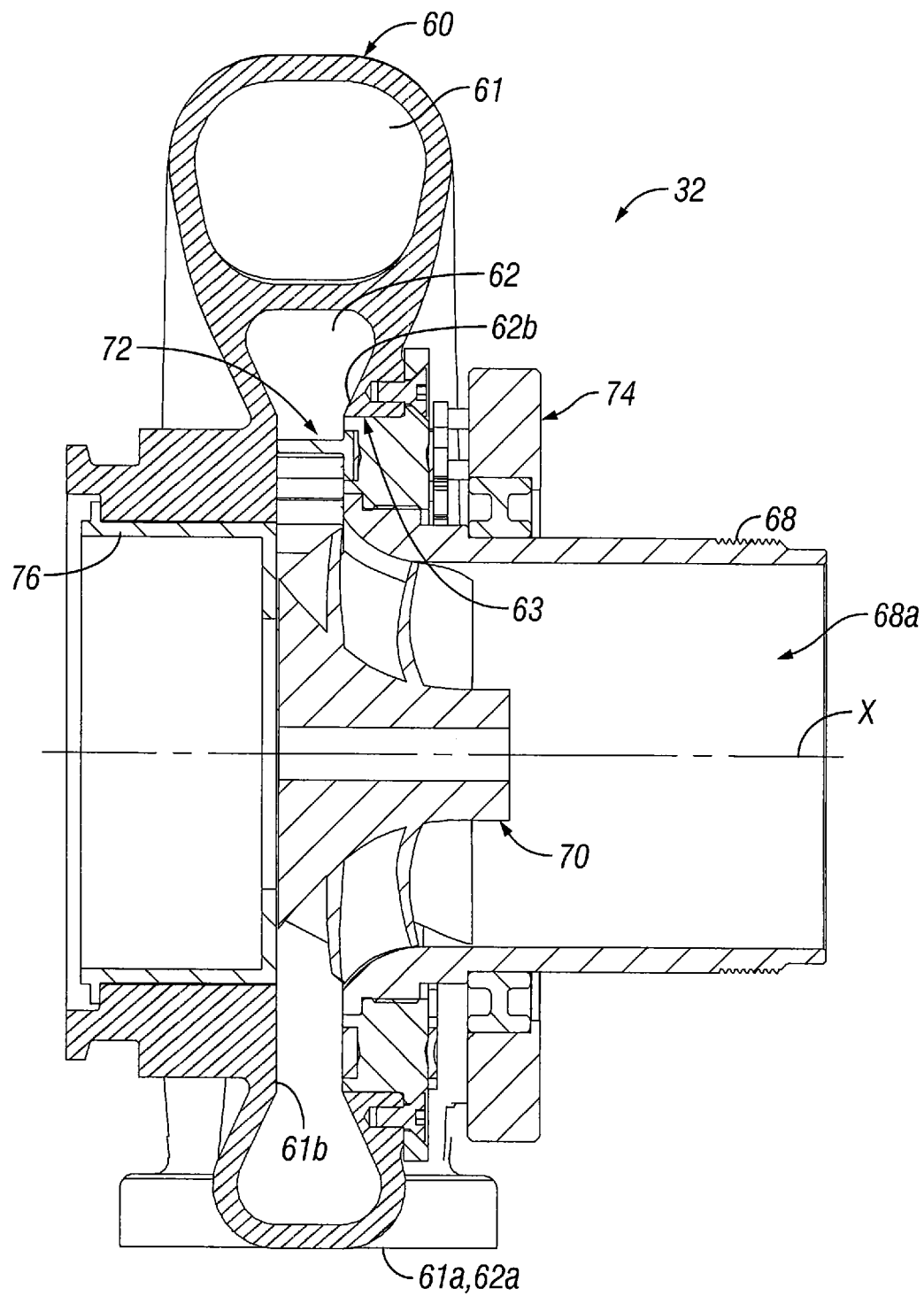
FIG. 19 is an axial cross sectional view of the asymmetry double-entry turbine illustrated in FIGS. 11 and 17 as seen along a section line 18-18 of FIG. 11.
Figure 20:
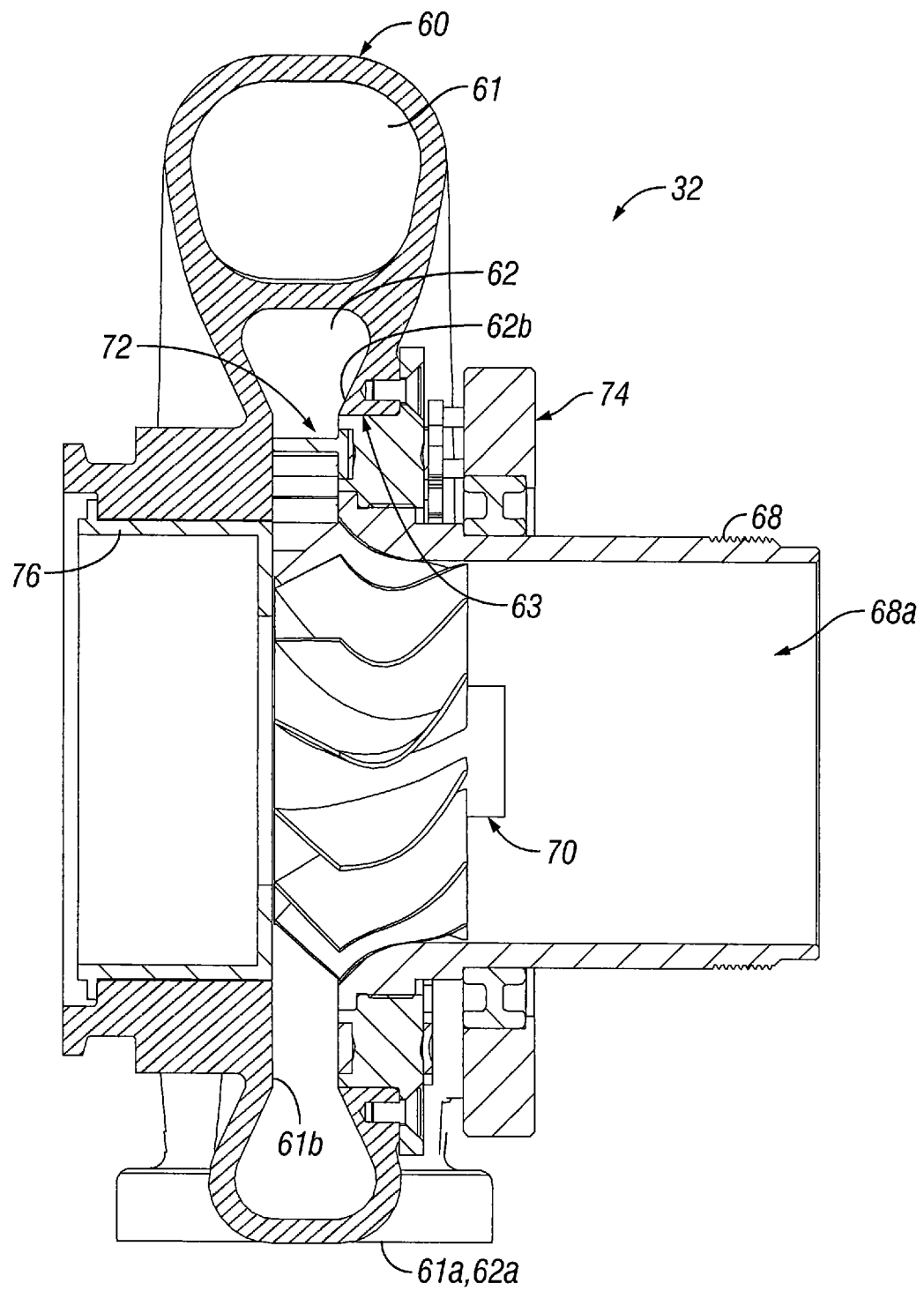
FIG. 20 is an axial cross sectional view of the asymmetry double-entry turbine illustrated in FIGS. 11 and 17 as seen along a section line 18-18 of FIG. 11 with the turbine wheel shown in elevation.
Figure 21:
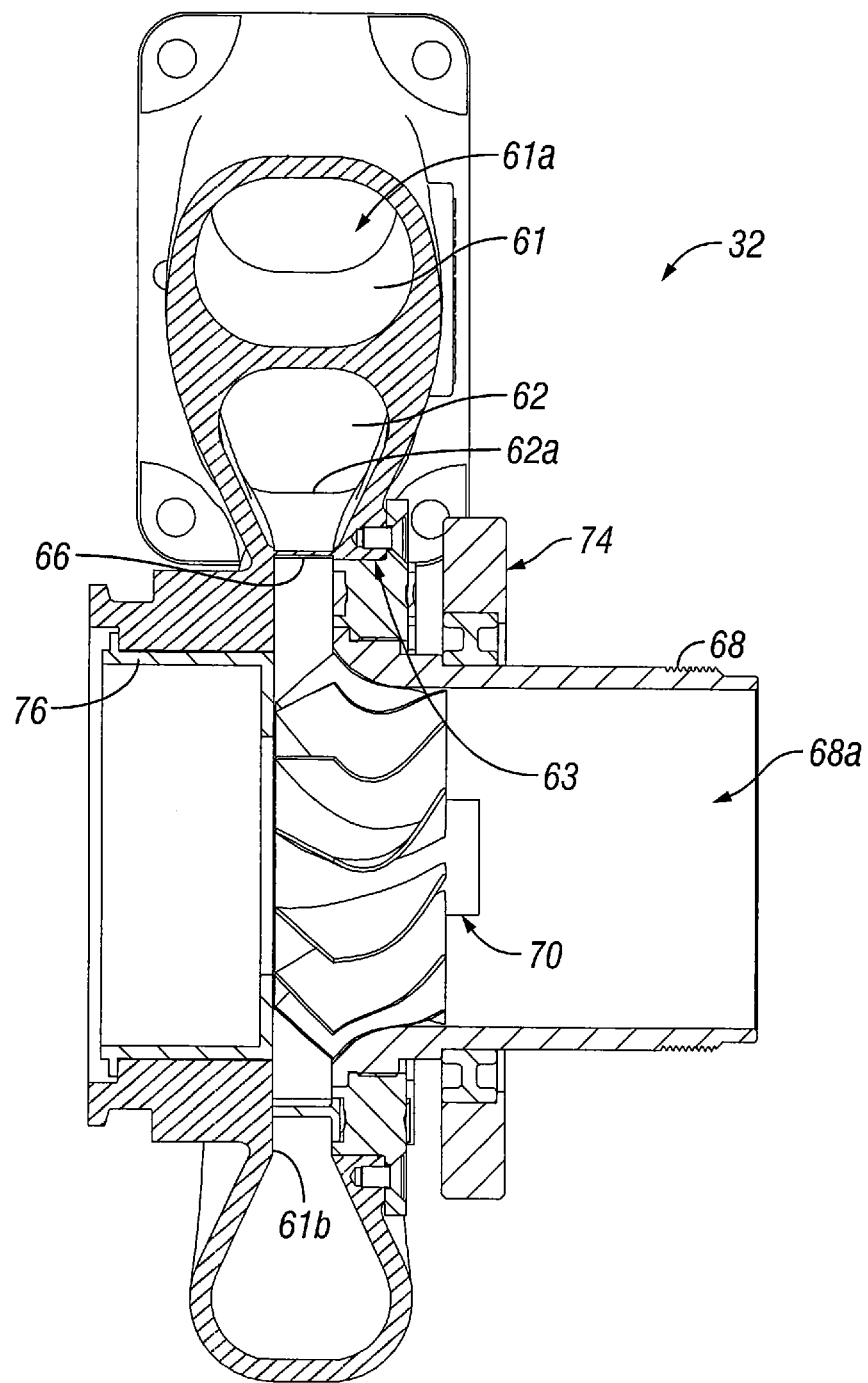
FIG. 21 is an axial cross sectional view of the asymmetry double-entry turbine illustrated in FIGS. 11 and 17 as seen along a section line 21-21 of FIG. 11 with the turbine wheel shown in elevation.
Figure 22:
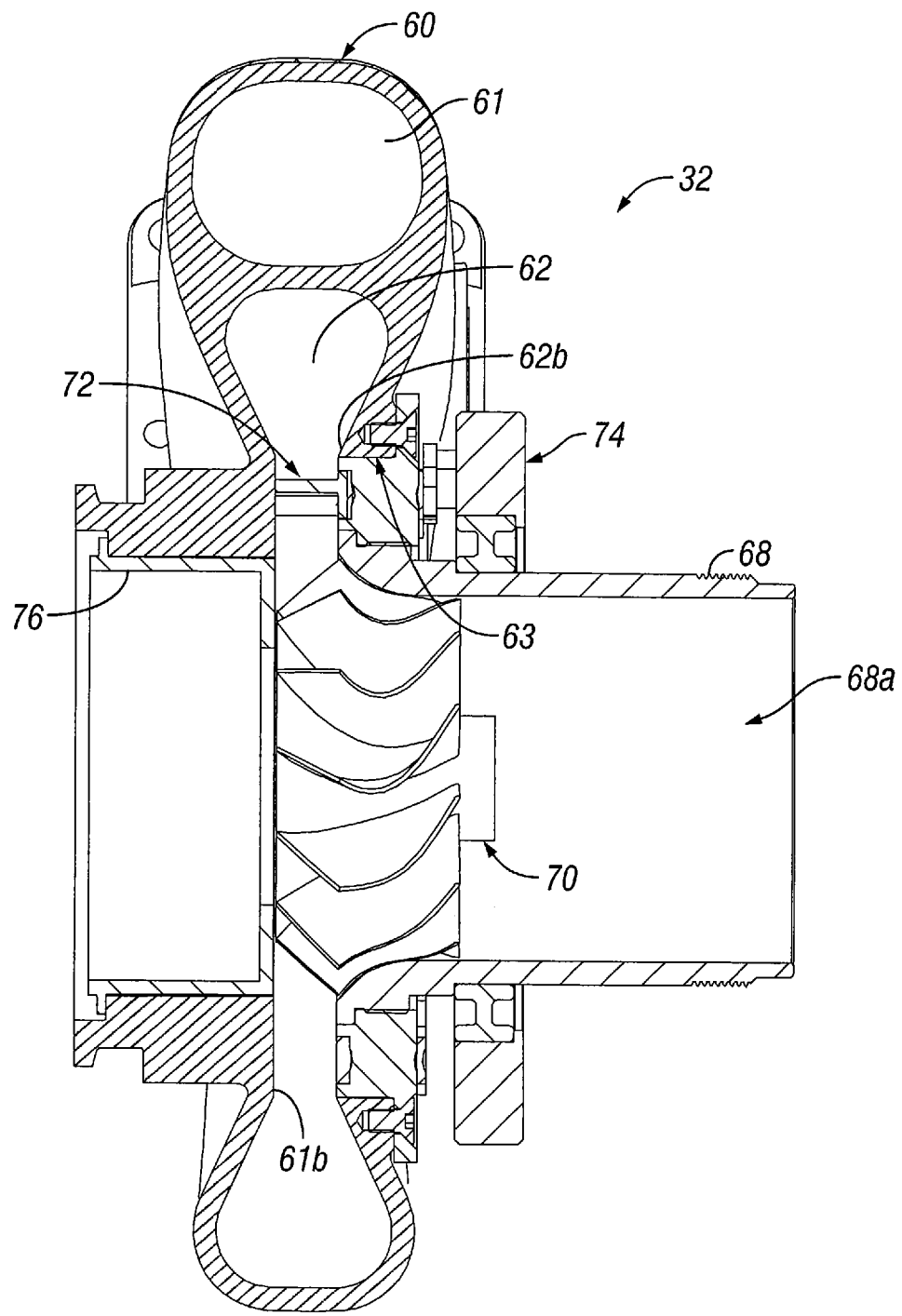
FIG. 22 is an axial cross sectional view of the asymmetry double-entry turbine illustrated in FIGS. 11 and 17 as seen along a section line 22-22 of FIG. 11 with the turbine wheel shown in elevation.
Figure 23:
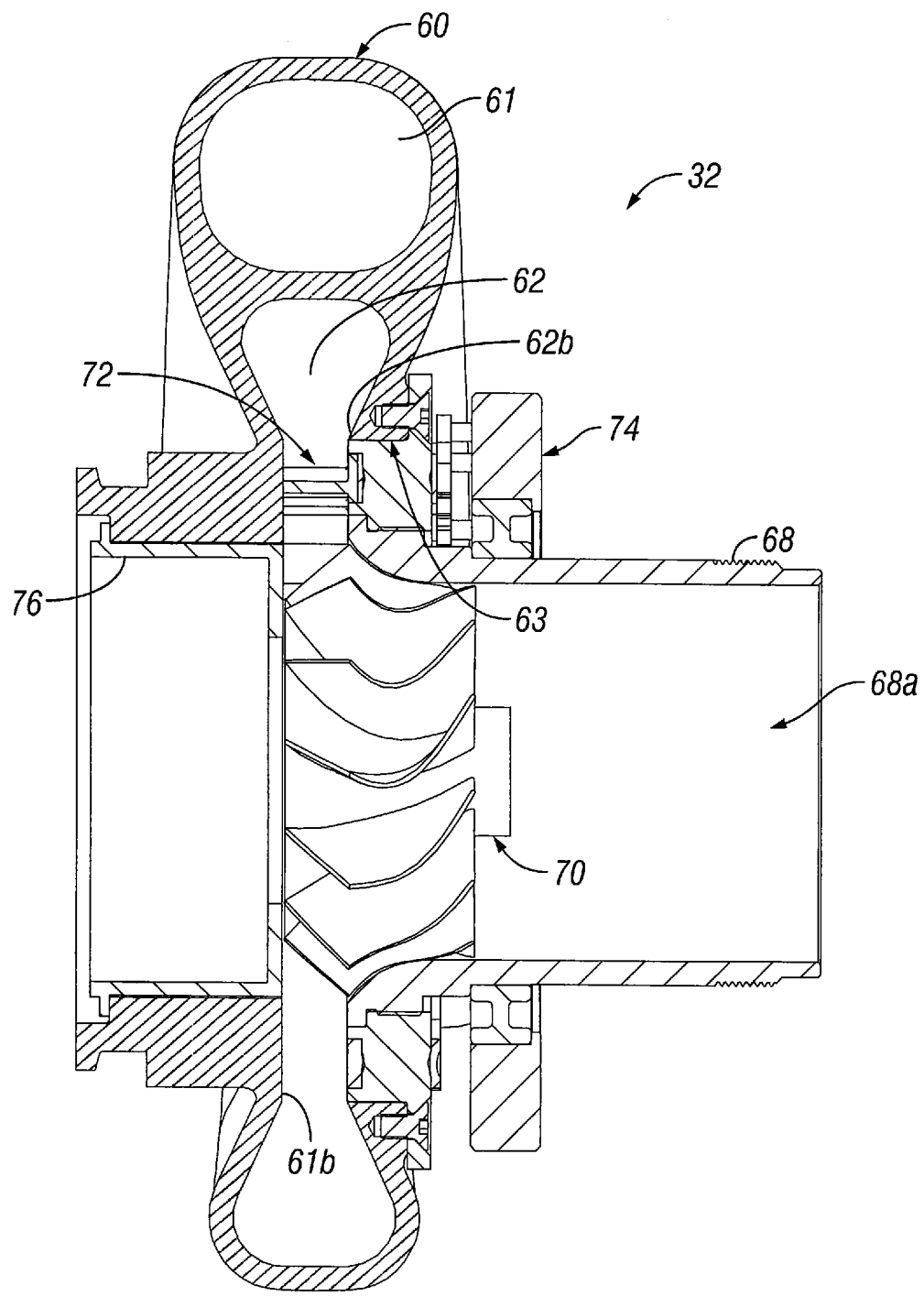
FIG. 23 is an axial cross sectional view of the asymmetry double-entry turbine illustrated in FIGS. 11 and 17 as seen along a section line 23-23 of FIG. 11 with the turbine wheel shown in elevation.
Figure 24:
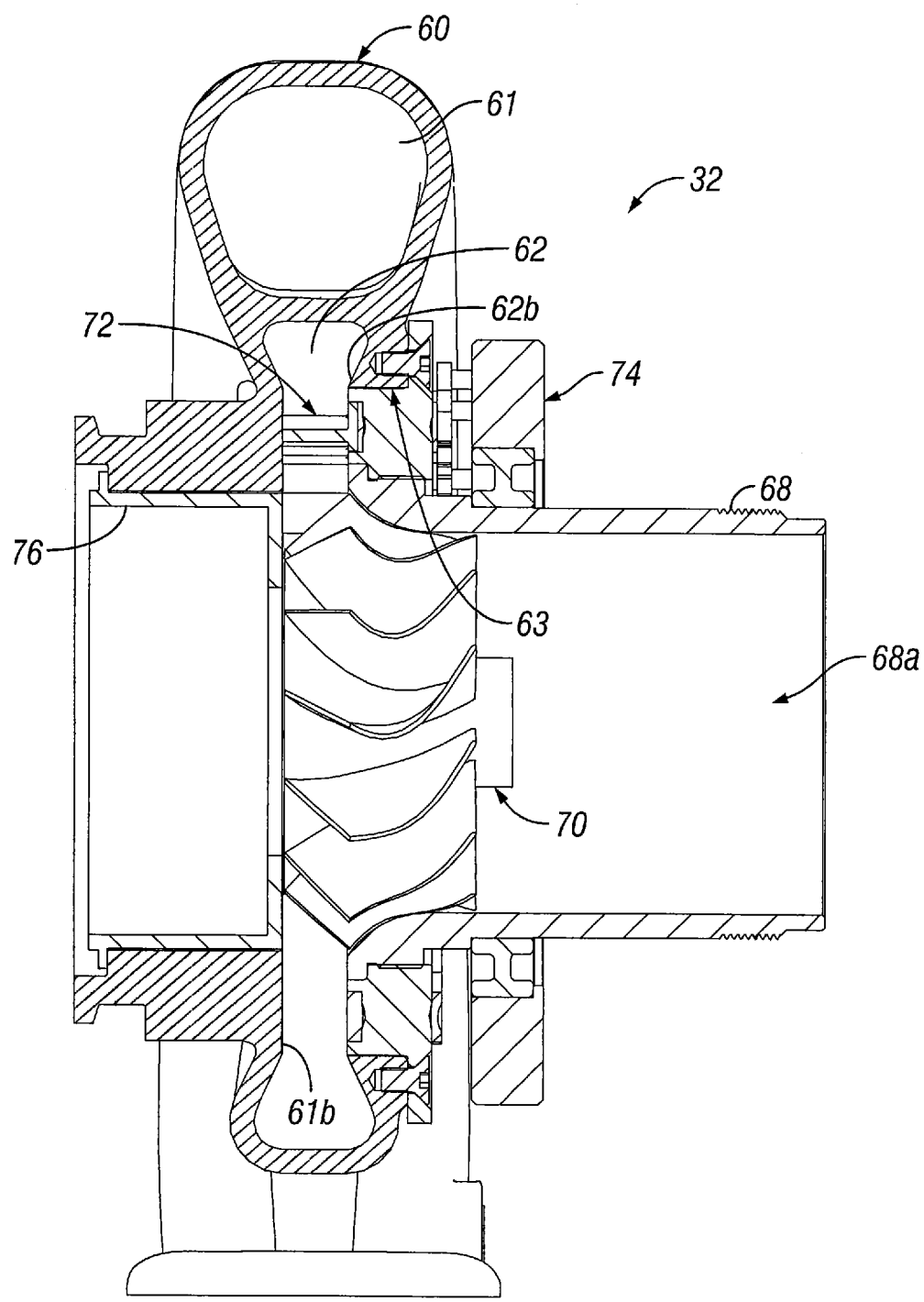
FIG. 24 is an axial cross sectional view of the asymmetry double-entry turbine illustrated in FIGS. 11 and 17 as seen along a section line 24-24 of FIG. 11 with the turbine wheel shown in elevation.
Figure 25:
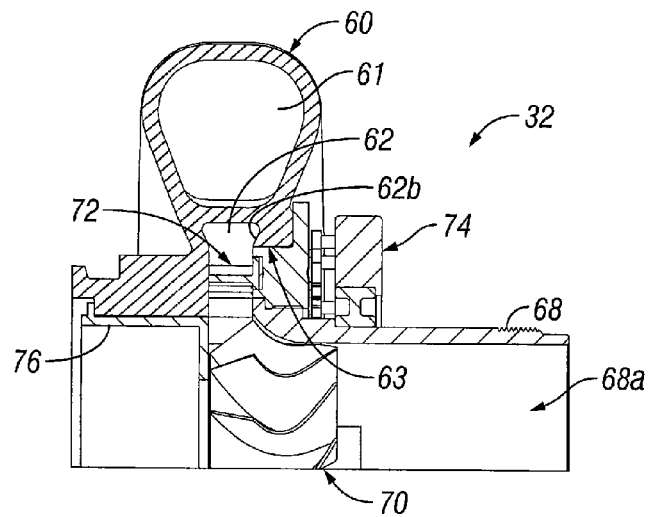
FIG. 25 is a half axial cross sectional view of the asymmetry double-entry turbine illustrated in FIGS. 11 and 17 as seen along a section line R-25 of FIG. 11 with the turbine wheel shown in elevation.
Figure 26:
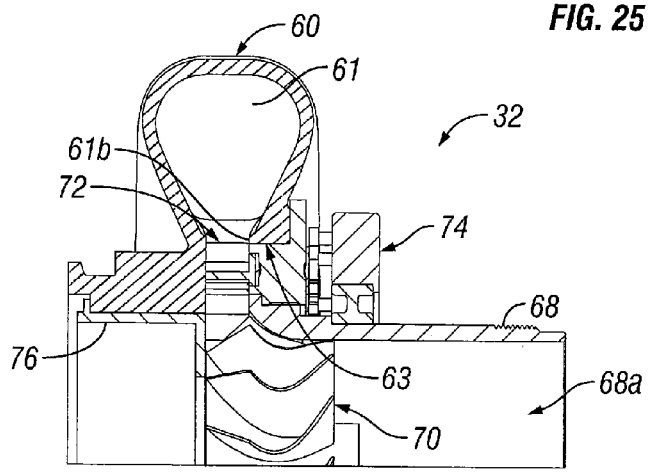
FIG. 26 is an half axial cross sectional view of the asymmetry double-entry turbine illustrated in FIGS. 11 and 17 as seen along a section line R-26 of FIG. 11 with the turbine wheel shown in elevation.
Figure 27:
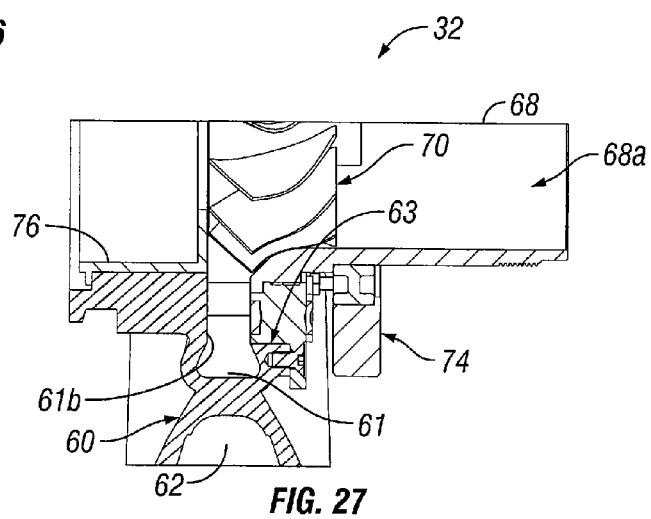
FIG. 27 is a partial axial cross sectional view of the asymmetry double-entry turbine illustrated in FIGS. 11 and 17 as seen along a section line 27-27 of FIG. 11 with the turbine wheel shown in elevation.

Referring now to FIGS. 19 and 27, various cross sections of the turbine housing 60 are illustrated to show the shapes of the first and second volutes 61 and 62. Preferably, in the areas of the first and second exhaust outlets 61b and 62b, the first and second volutes 61 and 62 have a trapezium cross sectional profile. More preferably, trapezium cross sectional profile of the first and second volutes 61 and 62 has a pair of flow surfaces that converge at a twenty-five degree gradient with respect to a plane that is perpendicular to the rotational axis X.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An asymmetric double-entry turbine housing comprising:
    a first volute having a first exhaust gas inlet and a first exhaust gas outlet;
    a second volute having a second exhaust gas inlet and a second exhaust gas outlet;
    a turbine receiving bore in fluid communication with the first exhaust gas outlet and the second exhaust gas outlet for conducting a flow of exhaust gas from the first exhaust gas outlet and the second exhaust gas outlet out in an axial direction, the first exhaust gas outlet having an angular opening amount of 200 degrees around the turbine receiving bore, and the second exhaust gas outlet having an angular opening amount of 160 degrees around the turbine receiving bore; and
    a plurality of vanes disposed in a circumferential arrangement around the turbine receiving bore along the second exhaust gas outlet, wherein the plurality of vanes includes a combination of variable geometry vanes and fixed geometry vanes.

2. The asymmetric double-entry turbine housing according to claim 1, wherein
    the second volute is disposed radially inward of the first volute with respect to a radial direction of the turbine receiving bore.

3. The asymmetric double-entry turbine housing according to claim 1, wherein
    the first volute has a cross sectional area at an upstream end of the first exhaust gas outlet that is greater than a cross sectional area of the second volute at an upstream end of the second exhaust gas outlet.

4. The asymmetric double-entry turbine housing according to claim 1, further comprising
    a turbine wheel rotatably disposed in the turbine receiving bore of the turbine housing.

5. A turbocharged internal combustion engine system comprising:
    an internal combustion engine having a plurality of combustion chambers;
    an intake passageway in fluid communication with the combustion chambers to supply intake air to the combustion chambers;
    an exhaust passageway in fluid communication with the combustion chambers to discharge exhaust gas to outside of the combustion chambers, the exhaust passageway including a first exhaust pipe having an inlet end that is fluidly connected to at least one of the combustion chambers and a second exhaust pipe having an inlet end that is fluidly connected to at least a different one of the combustion chambers from that of the first exhaust pipe;
    an exhaust gas recirculation line fluidly connected to recirculate a portion of the exhaust gas discharged from only the different one of the combustion chambers discharging to the second exhaust pipe; and
    a turbocharger including a compressor disposed in a portion of the intake passageway and an exhaust turbine disposed in a portion of the exhaust passageway,
    the exhaust turbine including an asymmetric double-entry turbine housing having first and second volutes that are circumferentially arranged about a turbine receiving bore of the asymmetric double-entry turbine housing, the first volute having a first exhaust gas inlet fluidly connected to the first exhaust pipe and a first exhaust gas outlet in fluid communication with the turbine receiving bore, the second volute having a second exhaust gas inlet fluidly connected to the second exhaust pipe and a second exhaust gas outlet in fluid communication with the turbine receiving bore;
    the turbocharged internal combustion engine system further comprising a plurality of vanes disposed in a circumferential arrangement around the turbine receiving bore along the second exhaust gas outlet, wherein the plurality of vanes includes a combination of variable geometry vanes and fixed geometry vanes.

6. The turbocharged internal combustion engine system according to claim 5, wherein
    the second volute is disposed radially inward of the first volute with respect to a radial direction of the turbine receiving bore.

7. The turbocharged internal combustion engine system according to claim 5, wherein
    the first volute has a cross sectional area at an upstream end of the first exhaust gas outlet that is greater than a cross sectional area of the second volute at an upstream end of the second exhaust gas outlet.

8. The turbocharged internal combustion engine system according to claim 5, further comprising:
    a turbine wheel rotatably disposed in the turbine receiving bore of the turbine housing.

9. The turbocharged internal combustion engine system according to claim 5, wherein
    the first exhaust gas outlet has an angular opening amount of more than 180 degrees around the turbine receiving bore, and the second exhaust gas outlet has an angular opening amount of less than 180 degrees around the turbine receiving bore.

10. The turbocharged internal combustion engine system according to claim 9, wherein
    the angular opening amount of the first exhaust gas outlet is 200 degrees around the turbine receiving bore, and the angular opening amount of the second exhaust gas outlet is 160 degrees around the turbine receiving bore.

* * * * *